US012663287B2

(12) United States Patent
Ogawa et al.

(10) Patent No.: US 12,663,287 B2
(45) Date of Patent: Jun. 23, 2026

(54) VEHICLE-MOUNTED APPARATUS, INFORMATION DISTRIBUTION APPARATUS, DRIVING ASSISTANCE SYSTEM, CONTROL METHOD, AND COMPUTER PROGRAM

(71) Applicant: Sumitomo Electric Industries, Ltd., Osaka (JP)

(72) Inventors: Akihiro Ogawa, Osaka (JP); Susumu Takeshima, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 207 days.

(21) Appl. No.: 18/024,513

(22) PCT Filed: Jul. 27, 2021

(86) PCT No.: PCT/JP2021/027665
§ 371 (c)(1),
(2) Date: Mar. 3, 2023

(87) PCT Pub. No.: WO2022/049924
PCT Pub. Date: Mar. 10, 2022

(65) Prior Publication Data
US 2023/0332920 A1 Oct. 19, 2023

(30) Foreign Application Priority Data

Sep. 7, 2020 (JP) ................................. 2020-149678

(51) Int. Cl.
*G01C 21/00* (2006.01)
*B60W 60/00* (2020.01)
(52) U.S. Cl.
CPC ....... *G01C 21/3837* (2020.08); *B60W 60/001* (2020.02); *G01C 21/3881* (2020.08);
(Continued)

(58) Field of Classification Search
CPC ............ G01C 21/3837; G01C 21/3881; G01C 21/3885; G01C 21/3848; B60W 60/001;
(Continued)

(56) References Cited

U.S. PATENT DOCUMENTS

2007/0168121 A1* 7/2007 Adachi .............. G01C 21/3837
701/532
2015/0254270 A1* 9/2015 Bollars ................... H04W 4/40
707/610
(Continued)

FOREIGN PATENT DOCUMENTS

CN 105937912 A 9/2016
JP 2011-081722 A 4/2011
(Continued)

*Primary Examiner* — Fadey S. Jabr
*Assistant Examiner* — Paula L Schneider
(74) *Attorney, Agent, or Firm* — XSENSUS LLP

(57) ABSTRACT

A vehicle-mounted apparatus includes a communication unit configured to receive data from an outside, a generation unit configured to generate from the data, dynamic maps in each of which dynamic information regarding a dynamic object is associated with a static map, a storage unit configured to store the dynamic maps and the static map, and a determination unit configured to determine whether to update a dynamic map, among the dynamic maps stored in the storage unit, corresponding to a specific region of the static map. The determination unit determines, in accordance with a degree of certainty of the dynamic map corresponding to the specific region, whether to update the dynamic map, and in response to the determination unit determining that the dynamic map is to be updated, the generation unit updates the dynamic map with a new dynamic map generated from data newly received by the communication unit.

19 Claims, 12 Drawing Sheets

(52) U.S. Cl.
CPC ..... *G01C 21/3885* (2020.08); *B60W 2556/20* (2020.02); *B60W 2556/40* (2020.02); *B60W 2556/50* (2020.02)

(58) Field of Classification Search
CPC ......... B60W 2556/20; B60W 2556/40; B60W 2556/50; B60W 2554/4029; G08G 1/01; G09B 29/00; C01C 21/3837; C01C 21/3881; C01C 2/3885; C01C 21/3848
USPC ........................................................ 701/450
See application file for complete search history.

(56) References Cited

U.S. PATENT DOCUMENTS

| | | | |
|---|---|---|---|
| 2016/0259814 A1 | 9/2016 | Mizoguchi | |
| 2017/0122749 A1* | 5/2017 | Urano ..................... | G01S 19/42 |
| 2017/0316333 A1* | 11/2017 | Levinson .............. | G06N 20/00 |
| 2018/0151076 A1 | 5/2018 | Hirotsu | |
| 2019/0220011 A1* | 7/2019 | Della Penna ........ | G07C 5/0841 |
| 2019/0311614 A1* | 10/2019 | Yang ...................... | G08G 1/052 |
| 2019/0322291 A1* | 10/2019 | Tsuda .................... | B60W 50/14 |
| 2021/0004363 A1* | 1/2021 | Bailly .................... | G06T 17/05 |
| 2021/0180987 A1* | 6/2021 | Terada ................. | H04W 4/029 |
| 2021/0339765 A1* | 11/2021 | Ichinose ........... | G01C 21/3815 |

FOREIGN PATENT DOCUMENTS

| | | | |
|---|---|---|---|
| JP | 2017-090548 A | 5/2017 | |
| JP | 2019-185756 A | 10/2019 | |
| JP | 2020-038360 A | 3/2020 | |
| WO | 2017/002590 A1 | 1/2017 | |

\* cited by examiner

Figure 12:
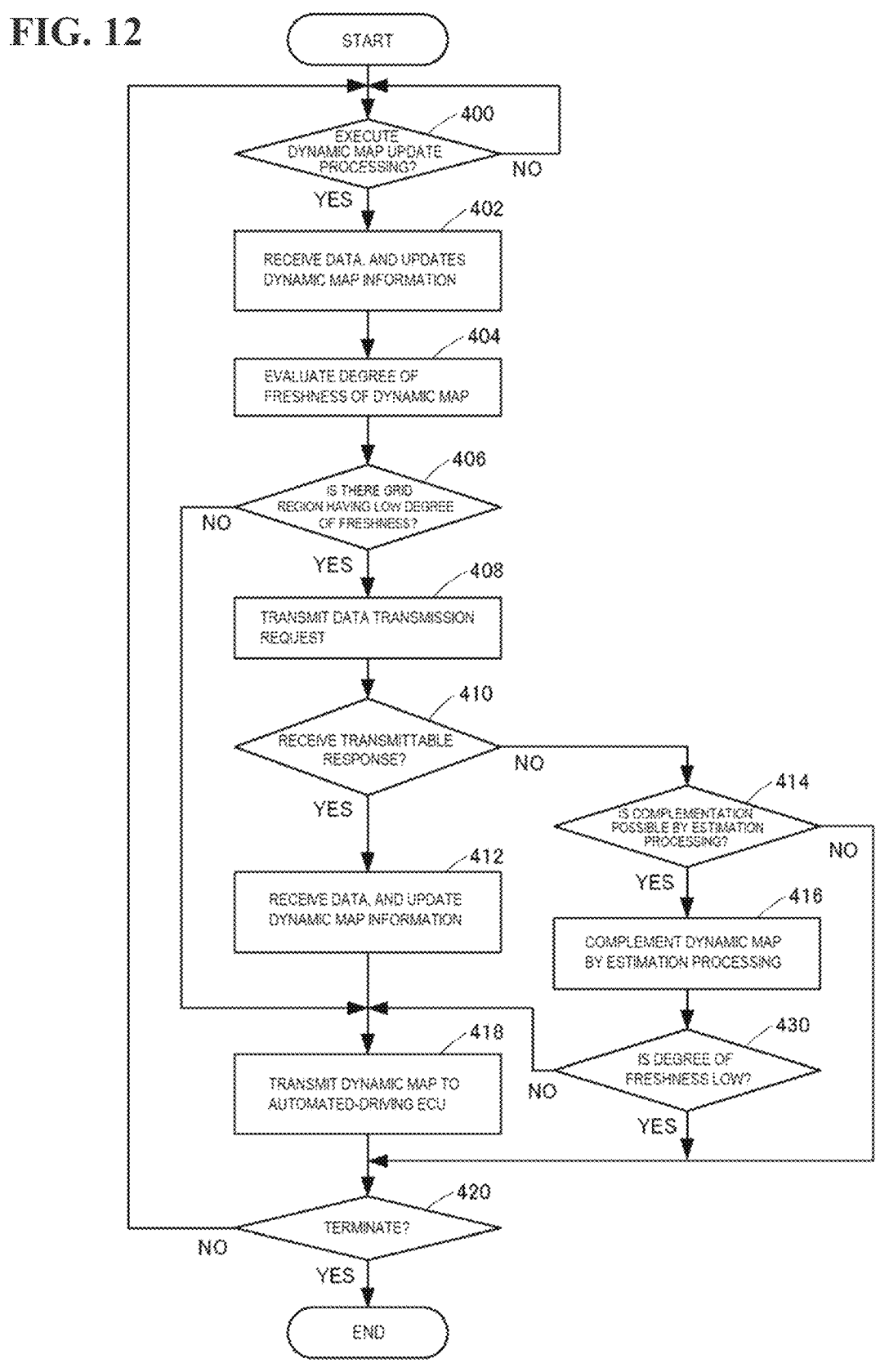

START

400
EXECUTE DYNAMIC MAP UPDATE PROCESSING?
NO
YES

402
RECEIVE DATA, AND UPDATES DYNAMIC MAP INFORMATION

404
EVALUATE DEGREE OF FRESHNESS OF DYNAMIC MAP

406
IS THERE GRID REGION HAVING LOW DEGREE OF FRESHNESS?
NO
YES

408
TRANSMIT DATA TRANSMISSION REQUEST

410
RECEIVE TRANSMITTABLE RESPONSE?
NO
YES

414
IS COMPLEMENTATION POSSIBLE BY ESTIMATION PROCESSING?
NO
YES

412
RECEIVE DATA, AND UPDATE DYNAMIC MAP INFORMATION

416
COMPLEMENT DYNAMIC MAP BY ESTIMATION PROCESSING

430
IS DEGREE OF FRESHNESS LOW?
NO
YES

418
TRANSMIT DYNAMIC MAP TO AUTOMATED-DRIVING ECU

420
TERMINATE?
NO
YES

END

VEHICLE-MOUNTED APPARATUS, INFORMATION DISTRIBUTION APPARATUS, DRIVING ASSISTANCE SYSTEM, CONTROL METHOD, AND COMPUTER PROGRAM

CROSS-REFERENCE TO RELATED APPLICATIONS

The present application is based on PCT/JP2021/027665, filed on Jul. 27, 2021, which claims priority to Japanese Patent Application No. 2020-149678, filed on Sep. 7, 2020, the entire contents of each are incorporated herein by reference.

FIELD OF THE INVENTION

The present disclosure relates to a vehicle-mounted apparatus, an information distribution apparatus, a driving assistance system, a control method, and a computer program.

BACKGROUND ART

Various systems for assisting a driver in driving an automobile, a motorcycle, or the like (hereinafter referred to as a vehicle) have been proposed. In such a system, sensor information is collected from road-side devices provided with various sensor devices (cameras, radars, and the like) installed on and around a road, and the sensor information is analyzed to provide traffic-related information (accidents, congestion, and the like) to a vehicle as dynamic driving assistance information. In addition, with the increase in the speed of mobile communication lines, it has been proposed to collect information not only from sensor devices mounted on roadside devices but also from sensor devices mounted on vehicles and effectively use the information for driving assistance. For example, the 3GPP (Third Generation Partnership Project) promoting standardization of the third generation mobile communication system and subsequent mobile communication systems has proposed a standard called cellular V2X. V means vehicle (Vehicle), and X means something other than vehicle. This standard aims at communication between a vehicle and something other than the vehicle by LTE (Long Term Evolution) and 5G (Fifth Generation Mobile Communication System).

Introduction of a plug-in hybrid electric vehicle (PHEV), an electric vehicle (EV), and the like is progressing. In recent vehicles including those vehicles, various electronic devices are mounted and an ECU (Electric Control Unit) for controlling the electronic devices is mounted. For example, an automated-driving ECU is mounted on a vehicle capable of automated driving. The automated-driving ECU communicates with the outside as appropriate and acquires necessary information (traffic information and dynamic driving assistance information). In addition, there are an engine control ECU, a stop-start control ECU, a transmission control ECU, an airbag control ECU, a power steering control ECU, a hybrid control ECU, and the like.

Patent Literature 1 below discloses a vehicle-to-vehicle communication device that calculates an expiration time of information in vehicle-to-vehicle communication and determines whether to use and transmit the information on the basis of the expiration time, thereby reducing a communication load or a storage capacity while maintaining a degree of freshness of the information. Patent Literature 2 below discloses a map update determination system that determines whether or not map information for an automated driving vehicle needs to be updated on the basis of an evaluation value of a travel plan. In this system, the evaluation value of the travel plan is calculated based on a comparison between a control target value and a control result detection value of the vehicle. This system calculates an evaluation value of a travel plan for each zone, and updates map information for a zone in which the calculated evaluation value is less than an evaluation threshold.

PRIOR ART LITERATURE

Patent Literature

[Patent Literature 1] Japanese Unexamined Patent Application Publication No. 2011-81722
[Patent Literature 2] Japanese Unexamined Patent Application Publication No. 2017-90548

SUMMARY OF THE INVENTION

A vehicle-mounted apparatus according to an aspect of the present disclosure includes a communication unit configured to receive data from an outside, a generation unit configured to generate from the data, dynamic maps in each of which dynamic information regarding a dynamic object is associated with a static map, a storage unit configured to store the dynamic maps and the static map, and a determination unit configured to determine whether to update a dynamic map, among the dynamic maps stored in the storage unit, corresponding to a specific region of the static map. The determination unit is configured to determine, in accordance with a degree of certainty of the dynamic map corresponding to the specific region, whether to update the dynamic map, and in response to the determination unit determining that the dynamic map corresponding to the specific region is to be updated, the generation unit is configured to update the dynamic map with a new dynamic map generated from data newly received by the communication unit.

An information distribution apparatus according to another aspect of the present disclosure includes a communication unit configured to receive data from an outside, a generation unit configured to generate from the data, dynamic maps in each of which dynamic information regarding a dynamic object is associated with a static map, a storage unit configured to store the dynamic maps and the static map, and a determination unit configured to determine whether to update a dynamic map, among the dynamic maps stored in the storage unit, corresponding to a specific region of the static map. The determination unit is configured to determine, in accordance with a degree of certainty of the dynamic map corresponding to the specific region, whether to update the dynamic map, in response to the determination unit determining that the dynamic map corresponding to the specific region is to be updated, the generation unit is configured to update the dynamic map with a new dynamic map generated from data newly received by the communication unit, and in response to the generation unit generating the new dynamic map, the communication unit is configured to transmit the new dynamic map to the outside.

A vehicle-mounted apparatus according to still another aspect of the present disclosure includes a receiving unit configured to receive the dynamic maps from the vehicle-mounted apparatus described above or the information distribution apparatus described above, and an automated-driving control unit configured to control automated driving of a vehicle in which the receiving unit is mounted, by using the dynamic maps received by the receiving unit.

A vehicle-mounted apparatus according to still another aspect of the present disclosure includes a receiving unit configured to receive dynamic maps from the vehicle-mounted apparatus described above or the information distribution apparatus described above, and a presenting unit configured to generate and present driving assistance information from the dynamic maps received by the receiving unit.

A driving assistance system according to still another aspect of the present disclosure includes a server, and a vehicle-mounted apparatus, the server being configured to receive sensor data from an outside, detect dynamic objects by analyzing the sensor data and generate pieces of dynamic information regarding displacement of the dynamic objects, and transmit data that includes at least one of the sensor data or the pieces of dynamic information to the vehicle-mounted apparatus, the vehicle-mounted apparatus includes a communication unit configured to receive the data transmitted from the server, a generation unit configured to generate from the data, dynamic maps in each of which a corresponding one of the pieces of dynamic information is associated with a static map, a storage unit configured to store the dynamic maps and the static map, and a determination unit configured to determine whether to update a dynamic map, among the dynamic maps stored in the storage unit, corresponding to a specific region of the static map. The determination unit is configured to determine, in accordance with a degree of certainty of the dynamic map corresponding to the specific region, whether to update the dynamic map, and in response to the determination unit determining that the dynamic map corresponding to the specific region is to be updated, the generation unit is configured to update the dynamic map with a new dynamic map generated from data newly received by the communication unit.

A control method according to still another aspect of the present disclosure for an apparatus having a communication function, the control method includes receiving data from an outside, generating from the data, dynamic maps in each of which dynamic information regarding a dynamic object is associated with a static map, storing the dynamic maps and the static map, determining whether to update a dynamic map, among the dynamic maps stored in the storing, corresponding to a specific region of the static map, in accordance with a degree of certainty of the dynamic map corresponding to the specific region, and updating, in response to a determination that the dynamic map corresponding to the specific region is to be updated in the determining, the dynamic map with a new dynamic map generated from data newly received in the communicating.

A computer program according to still another aspect of the present disclosure for causing a computer to execute a communication function of receiving data from an outside, a generation function of generating from the data, dynamic maps in each of which dynamic information regarding a dynamic object is associated with a static map, a storage function of storing the dynamic maps and the static map, a determination function of determining whether to update a dynamic map, among the dynamic maps stored by the storage function, corresponding to a specific region of the static map, in accordance with a degree of certainty of the dynamic map corresponding to the specific region, and an update function of updating, in response to a determination by the determination function, that the dynamic map corresponding to the specific region is to be updated, the dynamic map with a new dynamic map generated from data newly received by the communication function.

BRIEF DESCRIPTION OF THE DRAWINGS

FIG. 11 is a block diagram showing transmission and reception of data between a plurality of vehicle-mounted apparatuses and a server in the driving assistance system according to the present disclosure.

FIG. 12 is a flowchart showing processing of a vehicle inside-outside coordination unit, which is different from FIG. 9.

DETAILED DESCRIPTION OF THE INVENTION

Figure 1:
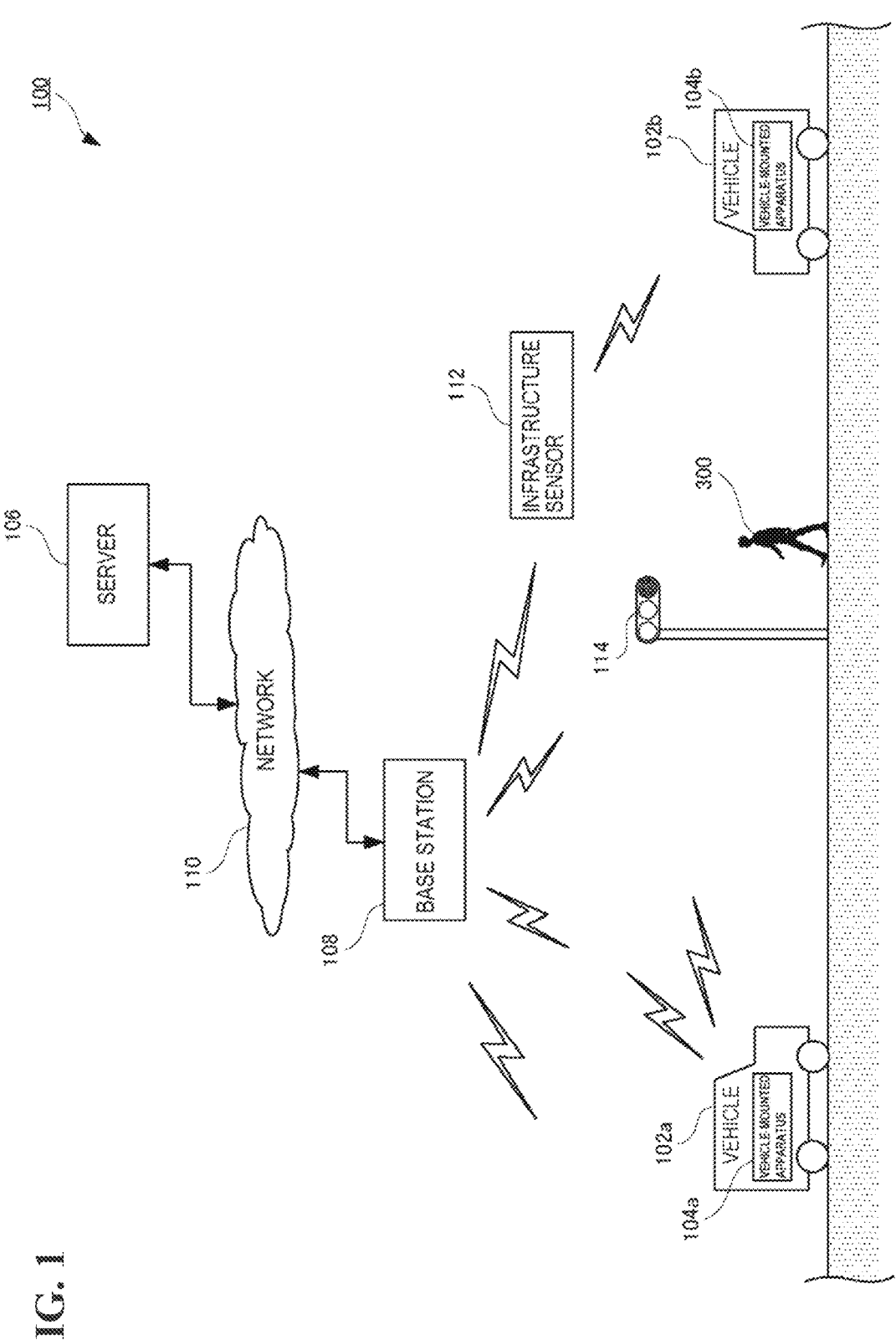
FIG. 1 is a schematic diagram showing a configuration of a driving assistance system according to an embodiment of the present disclosure.

Problems to be Solved by the Invention

It is conceivable to utilize dynamic driving assistance information in driving assistance of a vehicle, in particular in automated driving. There are multiple levels of automated driving. In real-time driving assistance (including automated driving), it is important to constantly update information to be used and maintain the accuracy (the degree of certainty). As the degree of certainty of information, for example, there is the newness (the degree of freshness) of information. Driving assistance based on old information is meaningless, and it is preferable to prevent driving assistance from being performed based on such information. For example, information that has been acquired or generated for a relatively long time is different from the actual traffic situation, and it is preferable to prevent such information from being used for automated driving.

According to Patent Literatures 1 and 2, the above-described preferable aspect cannot be realized. That is, none of the techniques disclosed in Patent Literatures 1 and 2 relates to dynamic driving assistance. Patent Literature 1 discloses discarding invalid information, but does not update the information. The update technique disclosed in Patent Literature 2 cannot be applied to map information having a high real-time property because the target of update is static map information.

Therefore, it is an object of the present disclosure to provide a vehicle-mounted apparatus, an information distribution apparatus, a driving assistance system, a control method, and a computer program that can maintain the degree of certainty of dynamic driving assistance information in a high state and realize highly reliable automated driving.

Effects of the Invention

According to the present disclosure, the degree of certainty of dynamic driving assistance information can be maintained in a high state, and highly reliable automated driving can be realized.

Description of Embodiments of the Present Disclosure

First, contents of embodiments of the present disclosure will be listed and described. At least some of the embodiments described below may be arbitrarily combined.

(1) A vehicle-mounted apparatus according to a first aspect of the present disclosure includes a communication unit configured to receive data from an outside, a generation unit configured to generate from the data, dynamic maps in each of which dynamic information regarding a dynamic object is associated with a static map, a storage unit configured to store the dynamic maps and the static map, and a determination unit configured to determine whether to update a dynamic map, among the dynamic maps stored in the storage unit, corresponding to a specific region of the static map. The determination unit is configured to determine, in accordance with a degree of certainty of the dynamic map corresponding to the specific region, whether to update the dynamic map, and in response to the determination unit determining that the dynamic map corresponding to the specific region is to be updated, the generation unit is configured to update the dynamic map with a new dynamic map generated from data newly received by the communication unit. As a result, the dynamic map which is dynamic driving assistance information can be maintained in a state where the degree of certainty is high. Therefore, when the dynamic map is used for automated driving, highly reliable automated driving can be realized.

(2) In response to the determination unit determining that the dynamic map corresponding to the specific region is to be updated, the communication unit may be configured to transmit to the outside, a transmission request for transmitting data that satisfies a predetermined condition on the degree of certainty, and in response to the communication unit receiving data transmitted in response to the transmission request, the generation unit may be configured to generate the new dynamic map from the data. As a result, when the degree of certainty of the dynamic map distributed from the server is low, necessary data can be received from a vehicle-mounted apparatus or the like mounted on another vehicle, so that the degree of certainty of the dynamic map can be maintained in a higher state. Therefore, when the dynamic map is used for automated driving, more reliable automated driving can be realized.

(3) The data may include sensor data, the dynamic map may include dynamic information regarding displacement of a dynamic object detected by the generation unit analyzing the sensor data, and the degree of certainty may be a degree of freshness of the dynamic information included in the dynamic map corresponding to the specific region. As a result, the degree of freshness of the dynamic map can be maintained in a high state. Therefore, when the dynamic map is used for automated driving, highly reliable automated driving can be realized.

(4) The vehicle-mounted apparatus may further includes an estimation processing unit configured to estimate for the dynamic object, displacement of the dynamic object during a period from a present time to a time when a predetermined time elapses. In response to the determination unit determining that the dynamic map corresponding to the specific region is to be updated, the estimation processing unit may be configured to estimate, for the dynamic object included in the specific region, the displacement of the dynamic object during the period from the present time to the time when the predetermined time elapses, and the generation unit may be configured to complement the dynamic map corresponding to the specific region by using the displacement. As a result, even when the degree of certainty of the dynamic map distributed from the server is low and necessary data cannot be received from a vehicle-mounted apparatus or the like mounted on another vehicle, the dynamic map can be complemented, so that the degree of freshness of the dynamic map can be maintained in a high state. Therefore, when the dynamic map is used for automated driving, highly reliable automated driving can be realized.

(5) The vehicle-mounted apparatus may further includes a control unit configured to control automated driving of a vehicle in which the vehicle-mounted apparatus is mounted. The control unit may be configured to use the dynamic maps stored in the storage unit in automated driving of the vehicle. As a result, highly reliable automated driving can be realized.

(6) The vehicle-mounted apparatus may further includes a degree-of-certainty determination unit configured to determine a degree of certainty of a dynamic map corresponding to a planned travel section of a vehicle in which the vehicle-mounted apparatus is mounted. In response to the degree-of-certainty determination unit determining that the degree of certainty is low, the control unit may be configured to not use the dynamic map corresponding to the planned travel section in automated driving of the vehicle. As a result, a dynamic map with a low degree of certainty can be avoided from being used for automated driving, and automated driving with high reliability can be realized. In addition, wasteful processing by the automated-driving ECU or the like can be avoided, wasteful communication inside the vehicle-mounted apparatus can be reduced, and the storage capacity can be reduced.

(7) The vehicle-mounted apparatus may further includes a control unit configured to control automated driving of a vehicle in which the vehicle-mounted apparatus is mounted, the control unit being configured to use the dynamic maps stored in the storage unit in automated driving of the vehicle, and a degree-of-certainty determination unit configured to determine a degree of certainty of the dynamic map complemented by the generation unit. In response to the degree-of-certainty determination unit determining that the degree of certainty is low, the control unit may be configured to not use the complemented dynamic map in automated driving of the vehicle. A dynamic map with a low degree of certainty can be avoided from being used for automated driving, and automated driving with high reliability can be realized. In addition, wasteful processing by the automated-driving ECU or the like can be avoided, wasteful communication inside the vehicle-mounted apparatus can be reduced, and the storage capacity can be reduced.

(8) The static map may be a road map, and the specific region may be one of a plurality of grid regions, on the road map, determined by dividing a region that includes at least a road in a grid-like form. This facilitates the generation and updating of the dynamic map.

(9) In response to the generation unit generating the new dynamic map, the communication unit may be configured to transmit the new dynamic map to the outside. As a result, a dynamic map with a high degree of certainty can be used in a vehicle-mounted apparatus or the like mounted on another vehicle.

(10) An information distribution apparatus according to a second aspect of the present disclosure includes a communication unit configured to receive data from an outside, a generation unit configured to generate from the data, dynamic maps in each of which dynamic information regarding a dynamic object is associated with a static map, a storage unit configured to store the dynamic maps and the static map, and a determination unit configured to determine whether to update a dynamic map, among the dynamic maps stored in the storage unit, corresponding to a specific region of the static map. The determination unit is configured to determine, in accordance with a degree of certainty of the dynamic map corresponding to the specific region, whether to update the dynamic map, in response to the determination unit determining that the dynamic map corresponding to the specific region is to be updated, the generation unit is configured to update the dynamic map with a new dynamic map generated from data newly received by the communication unit, and in response to the generation unit generating the new dynamic map, the communication unit is configured to transmit the new dynamic map to the outside. As a result, the information distribution apparatus can maintain the dynamic map, which is dynamic driving assistance information, in a state in which the degree of certainty is high. Therefore, the vehicle that has received the dynamic map can realize highly reliable automated driving.

(11) A vehicle-mounted apparatus according to a third aspect of the present disclosure includes a receiving unit configured to receive the dynamic maps from the vehicle-mounted apparatus or the information distribution apparatus, and a presenting unit configured to generate and present driving assistance information from the dynamic maps received by the receiving unit. As a result, the vehicle that has received the dynamic map can realize highly reliable automated driving.

(12) A vehicle-mounted apparatus according to a fourth aspect of the present disclosure includes a receiving unit configured to receive the dynamic maps from the vehicle-mounted apparatus or the information distribution apparatus, and a presenting unit configured to generate and present driving assistance information from the dynamic maps received by the receiving unit. As a result, the vehicle having received the dynamic map can realize highly reliable driving assistance.

(13) The degree of certainty is a degree of freshness of the dynamic information, the dynamic information includes a generation time and an expiration time of the dynamic information as the degree of freshness, and the determination unit is configured to determine on the basis of the generation time and the expiration time, whether to update the dynamic map. As a result, it is possible to efficiently determine whether or not the dynamic map needs to be updated.

(14) A driving assistance system according to a fifth aspect of the present disclosure includes a server, and a vehicle-mounted apparatus, the server being configured to receive sensor data from an outside, detect dynamic objects by analyzing the sensor data and generate pieces of dynamic information regarding displacement of the dynamic objects, and transmit data that includes at least one of the sensor data or the pieces of dynamic information to the vehicle-mounted apparatus, the vehicle-mounted apparatus includes a communication unit configured to receive the data transmitted from the server, a generation unit configured to generate from the data, dynamic maps in each of which a corresponding one of the pieces of dynamic information is associated with a static map, a storage unit configured to store the dynamic maps and the static map, and a determination unit configured to determine whether to update a dynamic map, among the dynamic maps stored in the storage unit, corresponding to a specific region of the static map. The determination unit is configured to determine, in accordance with a degree of certainty of the dynamic map corresponding to the specific region, whether to update the dynamic map, and in response to the determination unit determining that the dynamic map corresponding to the specific region is to be updated, the generation unit is configured to update the dynamic map with a new dynamic map generated from data newly received by the communication unit. As a result, the server can maintain the dynamic map, which is dynamic driving assistance information, in a state where the degree of certainty is high. Therefore, the vehicle that has received the dynamic map can realize highly reliable automated driving.

(15) A control method according to a sixth aspect of the present disclosure for an apparatus having a communication function, the control method includes receiving data from an outside, generating from the data, dynamic maps in each of which dynamic information regarding a dynamic object is associated with a static map, storing the dynamic maps and the static map, determining whether to update a dynamic map, among the dynamic maps stored in the storing, corresponding to a specific region of the static map, in accordance with a degree of certainty of the dynamic map corresponding to the specific region, and updating, in response to a determination that the dynamic map corresponding to the specific region is to be updated in the determining, the dynamic map with a new dynamic map generated from data newly received in the communicating. As a result, the dynamic map which is dynamic driving assistance information can be maintained in a state where the degree of certainty is high. Therefore, when the dynamic map is used for automated driving, highly reliable automated driving can be realized.

(16) A computer program according to a seventh aspect of the present disclosure for causing a computer to execute a communication function of receiving data from an outside, a generation function of generating from the data, dynamic maps in each of which dynamic information regarding a dynamic object is associated with a static map, a storage function of storing the dynamic maps and the static map, a determination function of determining whether to update a dynamic map, among the dynamic maps stored by the storage function, corresponding to a specific region of the static map, in accordance with a degree of certainty of the dynamic map corresponding to the specific region, and an update function of updating, in response to a determination by the determination function, that the dynamic map corresponding to the specific region is to be updated, the dynamic map with a new dynamic map generated from data newly received by the communication function. As a result, the dynamic map which is dynamic driving assistance information can be maintained in a state where the degree of certainty is high. Therefore, when the dynamic map is used for automated driving, highly reliable automated driving can be realized.

Details of Embodiments of the Present Disclosure

In the following embodiments, the same parts are denoted by the same reference numerals. Their names and functions are also the same. Therefore, detailed description thereof will not be repeated.

Overall Configuration

Referring to FIG. 1, a driving assistance system 100 according to an embodiment of the present disclosure includes vehicle-mounted apparatuses 104*a* and 104*b* mounted on a plurality of vehicles 102*a* and 102*b*, respectively, and a server 106. Communication between each of vehicle-mounted apparatuses 104*a* and 104*b* and server 106 is performed via a base station 108 and a network 110 for a wireless communication. Base station 108 provides a mobile communication service through, for example, a 4G (fourth generation mobile communication system) line and a 5G (fifth generation mobile communication system) line.

Vehicle-mounted apparatuses 104*a* and 104*b* mounted on vehicles 102*a* and 102*b*, respectively, have communication functions according to communication specifications (4G line, 5G line, etc.) served by base station 108. Vehicle-mounted apparatuses 104*a* and 104*b* also have a function (V2V (Vehicle to Vehicle)) of directly communicating with each other without going through base station 108.

An infrastructure sensor 112 fixedly installed on a road and its periphery (hereinafter also referred to as a roadside) and a traffic signal 114 for road traffic can also communicate with vehicle-mounted apparatus 104*a*, vehicle-mounted apparatus 104*b*, and server 106. A pedestrian 300 and vehicles 102*a* and 102*b* are detection targets of infrastructure sensor 112. Pedestrian 300 is also a detection target of sensors mounted on vehicles 102*a* and 102*b* (hereinafter, also referred to as in-vehicle sensors).

Infrastructure sensor 112 is a device installed on a roadside and having a function of acquiring information on the roadside, and has a communication function with base station 108. Infrastructure sensor 112 is, for example, an image sensor (a digital monitoring camera or the like), a radar (a millimeter wave radar or the like), a laser sensor (Light Detection And Ranging (LiDAR) or the like), or the like. In addition, infrastructure sensor 112 may be installed in or connected to a roadside device having a calculation function.

Server 106 receives data (hereinafter also referred to as sensor data) uploaded from infrastructure sensor 112 or the like via base station 108, analyzes the sensor data to generate a dynamic map, and stores the dynamic map as dynamic driving assistance information. When sensor data output from a sensor mounted on each of vehicle-mounted apparatus 104*a* and vehicle-mounted apparatus 104*b* is transmitted to server 106, server 106 also uses the sensor data to generate dynamic driving assistance information. The dynamic driving assistance information includes a dynamic map, an analysis result, and sensor data itself. The "dynamic map" is information relating to a dynamic object detected by a sensor (hereinafter referred to as dynamic information), which is associated with a static map (road map or the like). For example, as the dynamic map, a data structure can be adopted in which {information for specifying a dynamic object, dynamic information, information for specifying an area on a map} is set as one data set and data sets are included as many as the number of dynamic objects.

The dynamic object is not limited to a moving object (a person, a vehicle, or the like) and includes an object that has a moving function but is stationary. The dynamic information includes information related to displacement (position, magnitude and direction of change) of the dynamic object, and includes, for example, position, moving speed, moving direction, time information, and the like for each dynamic object. The dynamic information may also include estimation information. For example, if server 106 has a estimation function, it is possible to estimate a moving locus, a moving speed, and a moving direction in the future (within a predetermined time from the current time) using the moving locus, the moving speed, and the moving direction of the dynamic object up to the current time. Therefore, they may be included in the dynamic information. The time information includes, for example, a generation time and an expiration time of the dynamic information. This means that the generation time and the expiration time of dynamic information not including time information are added to the dynamic information (not including time information) to obtain new dynamic information. The expiration time represents an upper limit time during which the dynamic information can be effectively used after the dynamic information is generated.

The area on the map is, for example, each region (hereinafter referred to as a grid region) obtained by dividing the road map in a grid-like form. In this case, the dynamic map stores dynamic information included in each grid region in association with the grid region. The dynamic map is updated from time to time using new data. The dynamic information may include information of a traffic signal (information indicating a lighting state or the like).

Server 106 transmits dynamic driving assistance information to vehicles 102*a* and 102*b*. That is, server 106 functions as an information distribution apparatus. Server 106 also receives information indicating a state of a traffic signal (for example, information indicating a color of a lighting or a blinking state, hereinafter referred to as traffic information) uploaded from traffic signal 114 via base station 108, and uses the information to generate dynamic driving assistance information.

Although one base station 108, one infrastructure sensor 112, one traffic signal 114, and two vehicles 102*a* and 102*b* are shown in FIG. 1 as an example, a plurality of base stations are normally provided and a mobile communication function is provided to three or more vehicles. Two or more infrastructure sensors 112 may be installed in a specific region such as an intersection point.

[Hardware Configuration of Vehicle-Mounted Apparatus]

Figure 2:
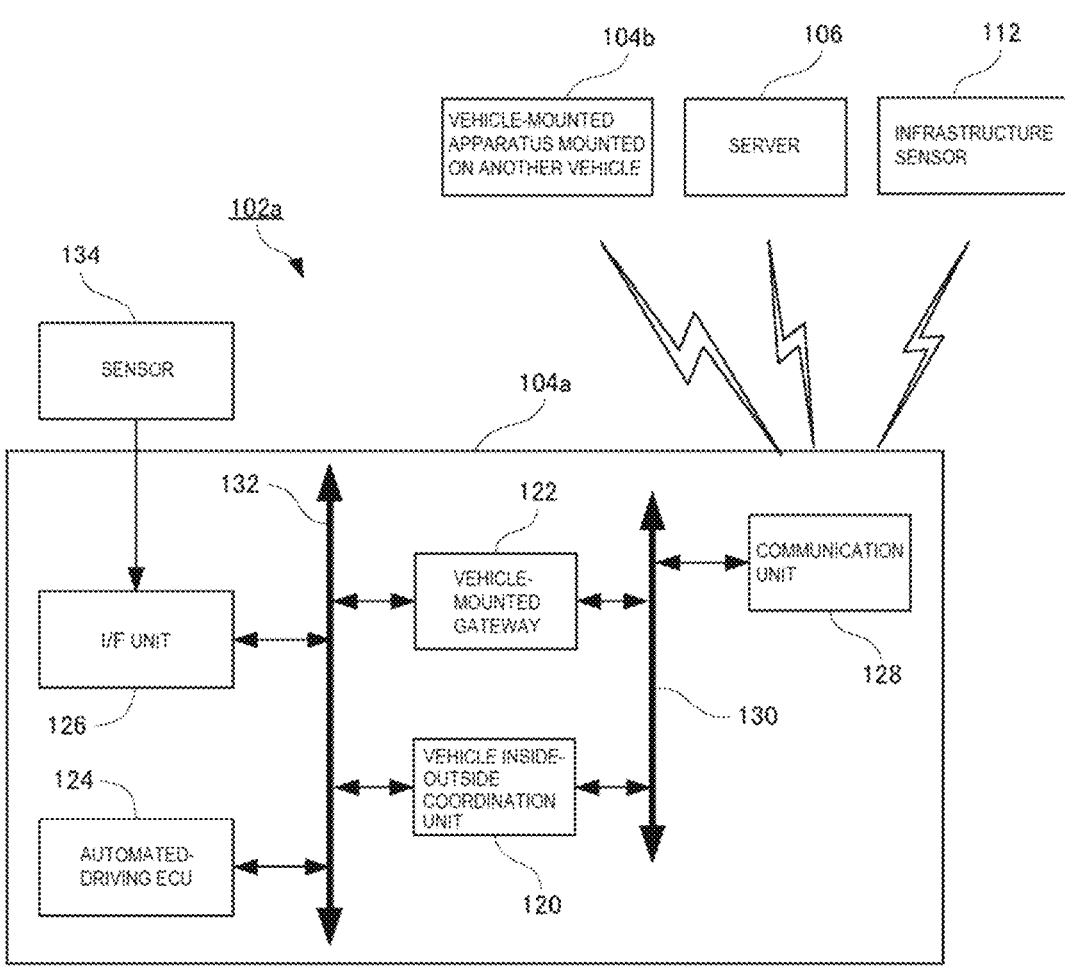
FIG. 2 is a block diagram showing a hardware configuration of a vehicle-mounted apparatus.

Referring to FIG. 2, an example of a hardware configuration of vehicle-mounted apparatus 104*a* mounted on vehicle 102*a* is shown. Vehicle-mounted apparatus 104*b* mounted on vehicle 102*b* is similarly configured. Vehicle-mounted apparatus 104*a* includes a vehicle inside-outside coordination unit 120, a vehicle-mounted gateway 122, an automated-driving ECU 124, an I/F unit 126, a communication unit 128, and buses 130 and 132. Vehicle-mounted apparatus 104*a* includes a plurality of ECUs in addition to automated-driving ECU 124, which are not shown in FIG. 2.

Communication unit 128 performs wireless communication with an external apparatus of vehicle 102*a* (for example, communication with server 106 via base station 108). Communication unit 128 includes an IC for performing modulation and multiplexing employed in wireless communication, an antenna for transmitting and receiving radio waves of a predetermined frequency, an RF circuit, and the like. Communication unit 128 also has a function of communicating with a Global Navigation Satellite System (GNSS) such as a Global Positioning System (GPS).

Vehicle-mounted gateway 122 has a role (communication protocol conversion and the like) of joining a communication function (communication specification) with the outside of the vehicle and a communication function (communication specification) in the vehicle. Automated-driving ECU 124 can communicate with an external apparatus through vehicle-mounted gateway 122 and communication unit 128. Vehicle inside-outside coordination unit 120 acquires a dynamic map and data (sensor data, an analysis result of the sensor data, and the like) used to generate the dynamic map out of information received from the outside via communication unit 128, and updates the dynamic map as will be described later. Vehicle inside-outside coordination unit 120 may acquire a dynamic map and data used to generate the dynamic map through vehicle-mounted gateway 122. The updated dynamic map is transmitted to automated-driving ECU 124. Data exchange between the units is performed via buses 130 and 132.

A sensor 134 is mounted on vehicle 102a. Sensor 134 includes a sensor (a video image capturing device (for example, a digital camera (a CCD camera or a CMOS camera)), a laser sensor (LiDAR), or the like) for acquiring information on the outside of vehicle 102a and a sensor (an acceleration sensor, a load sensor, or the like) for acquiring information on the vehicle itself. Sensor 134 acquires information within a detection range (an imaging range in the case of a camera) and outputs the information as sensor data. In the case of a digital camera, digital image data is output. A signal (analog or digital) from sensor 134 is input to I/F unit 126. I/F unit 126 includes an A/D conversion unit, and generates and outputs digital data when an analog signal is input. The generated digital data is transmitted to vehicle inside-outside coordination unit 120, vehicle-mounted gateway 122, and automated-driving ECU 124 through bus 132. When the output signal of sensor 134 is digital data, I/F unit 126 outputs the input digital data to bus 132.

Automated-driving ECU 124 controls traveling of vehicle 102a. For example, automated-driving ECU 124 acquires sensor data from I/F unit 126, analyzes the sensor data to grasp a situation around the vehicle, and controls mechanisms related to automated driving (mechanisms such as an engine, a transmission, a steering, and a brake. Hereinafter referred to as an automated driving mechanism). Automated-driving ECU 124 uses the dynamic map acquired from vehicle inside-outside coordination unit 120 for automated driving. Automated-driving ECU 124 receives dynamic driving assistance information, traffic information, and the like from an external apparatus through communication unit 128 and vehicle-mounted gateway 122 and use the received information for automated driving.

The sensor data may be transmitted to server 106. For example, vehicle inside-outside coordination unit 120 generates packet data including the sensor data acquired from I/F unit 126, and transmits the packet data from communication unit 128 to server 106 via base station 108.

[Hardware Configuration of Vehicle Inside-Outside Coordination Unit]

Figure 3:
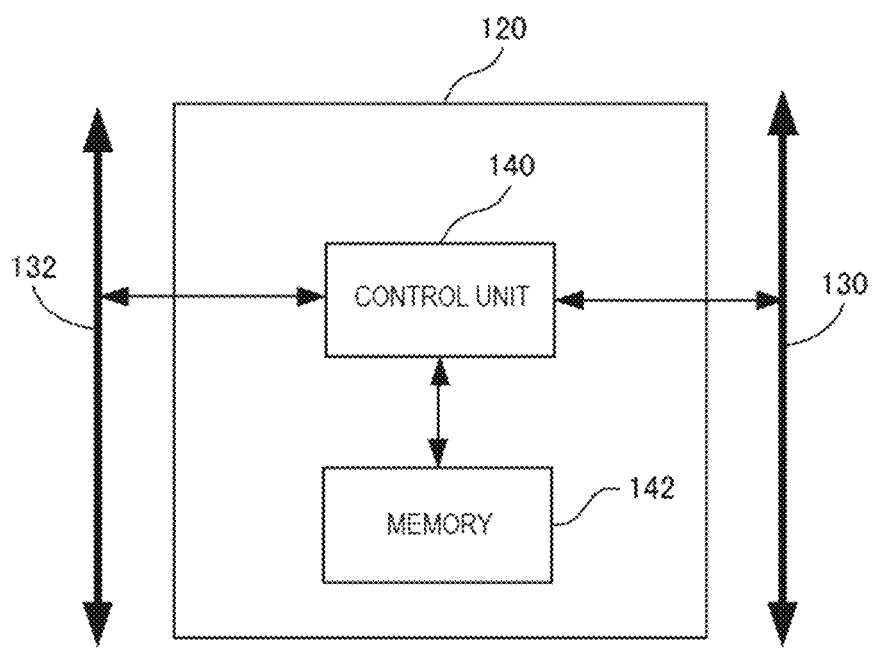
FIG. 3 is a block diagram showing a hardware configuration of the vehicle inside-outside coordination unit shown in FIG. 2.

Referring to FIG. 3, vehicle inside-outside coordination unit 120 includes a control unit 140 and a memory 142. Control unit 140 includes a CPU (Central Processing Unit) and controls memory 142. Memory 142 is, for example, a rewritable nonvolatile semiconductor memory, and stores a program executed by control unit 140. Memory 142 provides a work area for a program executed by control unit 140.

[Hardware Configuration of Automated-Driving ECU]

Figure 4:
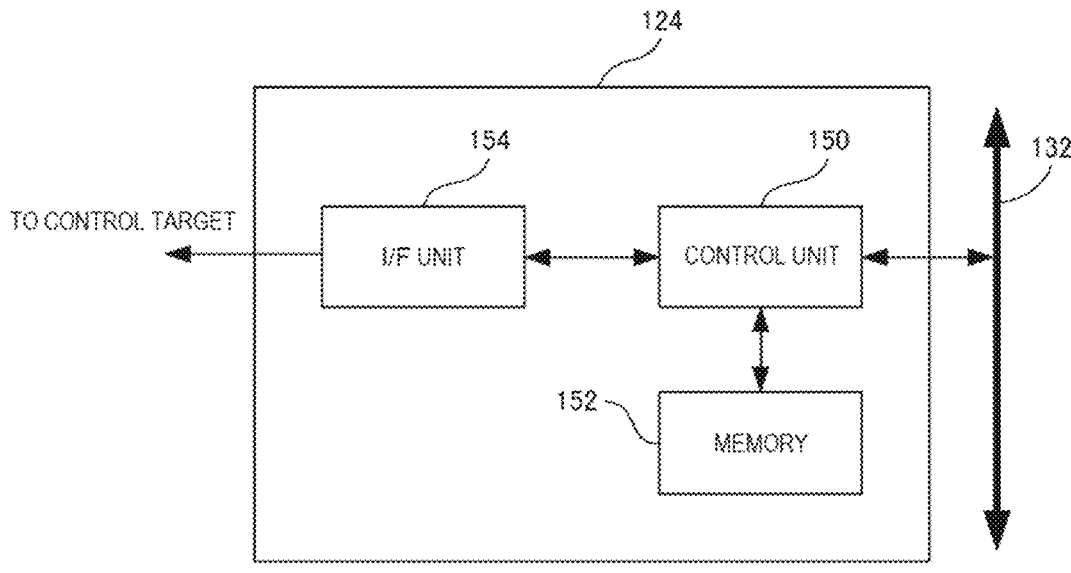
FIG. 4 is a block diagram showing a hardware configuration of the automated-driving ECU shown in FIG. 2.

Referring to FIG. 4, automated-driving ECU 124 includes a control unit 150, a memory 152, and an I/F unit 154. Control unit 150 is configured to include a CPU and controls memory 152 and I/F unit 154. Memory 152 is, for example, a rewritable nonvolatile semiconductor memory, and stores a program executed by control unit 150. Memory 152 provides a work area for a program executed by control unit 150. I/F unit 154 outputs control data for automated driving to an automated driving mechanism that is a control target.

[Hardware Configuration of Server]

Figure 5:
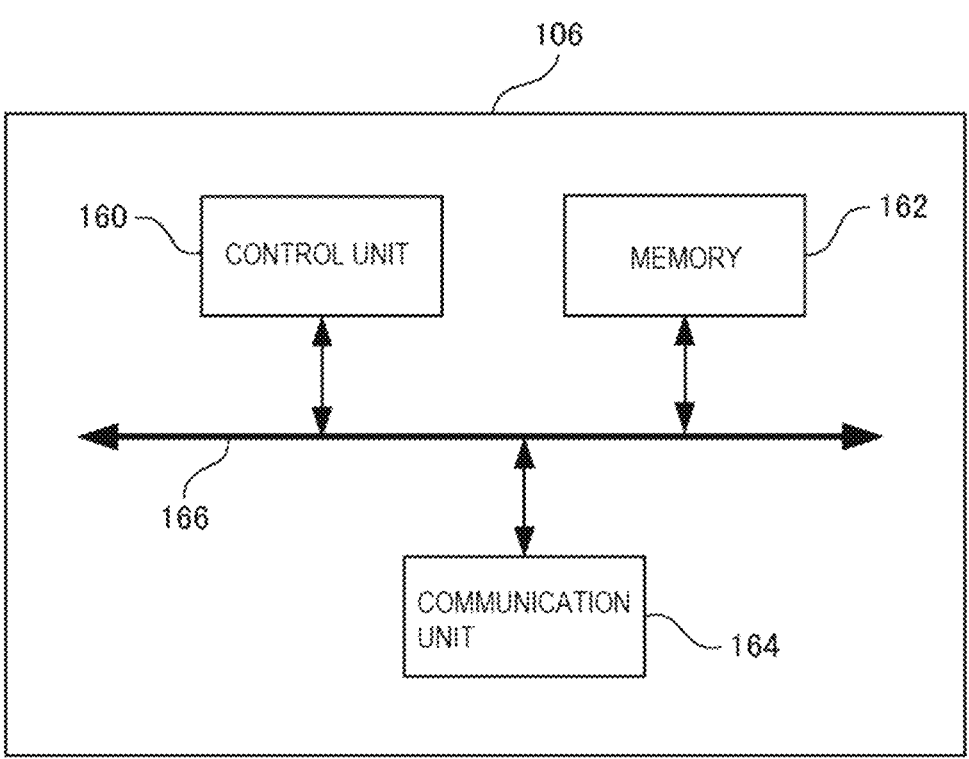
FIG. 5 is a block diagram showing a hardware configuration of the server shown in FIG. 1.

Referring to FIG. 5, server 106 includes a control unit 160, a memory 162, a communication unit 164, and a bus 166. Server 106 is, for example, a computer. Data transmissions between the units are performed via bus 166. Control unit 160 includes, for example, a CPU, controls each unit, and realizes various functions of server 106. Memory 162 includes a rewritable nonvolatile semiconductor memory and a mass storage device such as an HDD (Hard Disk Drive). Communication unit 164 receives sensor data and the like uploaded from a vehicle-mounted apparatus, an infrastructure sensor, and the like. The data received by communication unit 164 is transmitted to memory 162 and stored as a database. Control unit 160 reads data from memory 162 as appropriate, executes predetermined analysis processing (for example, analysis for obtaining dynamic driving assistance information), and stores the result in memory 162 as a dynamic map. Control unit 160 reads out the dynamic map and the sensor data itself and the like as the dynamic driving assistance information from memory 162 as appropriate, and transmits the dynamic map and the sensor data to vehicle-mounted apparatuses 104a and 104b.

[Hardware Configuration and Function of Infrastructure Sensor]

Figure 6:
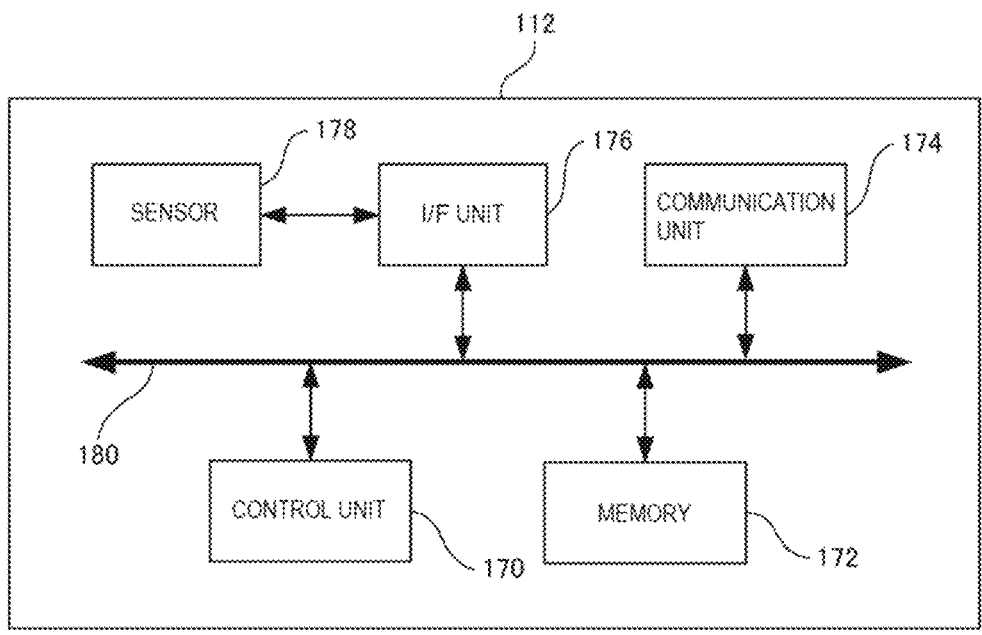
FIG. 6 is a block diagram showing a hardware configuration of the infrastructure sensor shown in FIG. 1.

FIG. 6 shows an example of a hardware configuration of infrastructure sensor 112. Infrastructure sensor 112 includes a control unit 170, a memory 172 that stores data, a communication unit 174 that performs wireless communication, an I/F unit 176, a sensor 178, and a bus 180 for exchanging data between the units. Control unit 170 controls each unit.

Sensor 178 is, for example, a video image capture device (for example, a digital camera). A signal (analog or digital) from sensor 178 is input to I/F unit 176. I/F unit 176 is configured similarly to I/F unit 126 (FIG. 2), and generates digital data from the input signal and outputs the digital data. The output data is transmitted via bus 180 to and stored in memory 172. Memory 172 is, for example, a rewritable nonvolatile semiconductor memory or an HDD.

Communication unit 174 has a mobile communication function and performs communication with server 106 via base station 108 (FIG. 1). Since infrastructure sensor 112 is fixedly installed, it is not necessary to support a plurality of mobile communication systems, and it is only necessary to support a mobile communication system (for example, a 5G line) provided by nearby base station 108. Communication unit 174 includes an IC for performing modulation and multiplexing, an antenna for emitting and receiving radio waves of a predetermined frequency, an RF circuit, and the like. Note that the communication function of infrastructure sensor 112 installed in a fixed manner is not limited to the case where the communication function is performed via base station 108, and is arbitrary. A communication function based on a wired LAN or a wireless LAN such as WiFi may be used. In the case of WiFi communication, a device (wireless router or the like) that provides a WiFi service is provided separately from base station 108 for mobile communication, and infrastructure sensor 112 communicates with server 106 via base station 108.

Control unit 170 is configured to include a CPU, and realizes the function of infrastructure sensor 112 by controlling each unit. That is, control unit 170 reads sensor data (for example, moving image data) acquired by I/F unit 176 and stored in memory 172 at a predetermined time interval, generates packet data, and transmits the packet data from communication unit 174 to server 106 via base station 108.

[Hardware Configuration and Function of Traffic Signal]

Traffic signal 114 is a traffic signal for road traffic. In the case of a vehicular signal, it is provided with indication lamps of three colors of green, yellow and red, a control unit for controlling lightning and blinking thereof, and a communication unit for transmitting traffic information which is information representing the state of the indication lamps to server 106. In the case of a pedestrian signal, it is configured similarly to the vehicular signal, except that the indication lamps are two colors of green and red in the pedestrian signal. A communication unit of traffic signal 114 has a mobile communication function similarly to communication unit 174 of infrastructure sensor 112, and communicates with server 106 via base station 108. Note that the communication function of fixedly installed traffic signal 114 is arbitrary. A communication function based on a wired LAN or a wireless LAN such as WiFi may be used. A control unit of traffic signal 114 is configured to include a CPU, and transmits traffic information indicating the current state of the traffic signal to server 106 via base station 108 every time the state of the indication lamp is changed, in addition to controlling the lighting and the blinking of the indication lamp.

[Hardware Configuration and Function of Base Station]

Base station 108 includes a computer configured similarly to server 106 and a wireless communication device that operates under the control of the computer. Base station 108 provides a wireless communication service to vehicle-mounted apparatus 104a, vehicle-mounted apparatus 104b, infrastructure sensor 112, and traffic signal 114 through the wireless communication device according to a predetermined wireless communication scheme.

[Functional Configuration]

The functions of vehicle inside-outside coordination unit 120 and automated-driving ECU 124 in vehicle-mounted apparatus 104a will be described with reference to FIG. 7. Vehicle inside-outside coordination unit 120 includes an information acquisition unit 200, a dynamic-map generation unit 202, a storage unit 204, a target area identifying unit 206, an update necessity determination unit 208, an estimation processing unit 210, and an output unit 212. Automated-driving ECU 124 includes a planned-travel-section identifying unit 220, a degree-of-freshness determination unit 222, a travel plan generation unit 224, and a control information generation unit 226. Each function of vehicle inside-outside coordination unit 120 is realized by control unit 140 shown in FIG. 3 executing a program read from memory 142 using memory 142 as a work area. Each function of automated-driving ECU 124 is realized by control unit 150 shown in FIG. 4 executing a program read from memory 152 using memory 152 and I/F unit 154. Note that the functions of vehicle inside-outside coordination unit 120 and automated-driving ECU 124 may be realized by dedicated hardware (a circuit board, an Application Specific Integrated Circuit (ASIC), or the like).

[Functional Configuration of In-Vehicle Cooperation Device]

Information acquisition unit 200 acquires data received by communication unit 128 from the external apparatus (server 106, infrastructure sensor 112, and vehicle-mounted apparatus 104b) and outputs the data to dynamic-map generation unit 202, target area identifying unit 206, estimation processing unit 210, and planned-travel-section identifying unit 220. Positional information such as GPS data among the received data is output to target area identifying unit 206 and planned-travel-section identifying unit 220. Sensor data, analysis result data (dynamic information, dynamic map, and the like), and the like among the received data are output to dynamic-map generation unit 202 and estimation processing unit 210. As will be described later, information acquisition unit 200 requests the external apparatus to transmit data for updating dynamic information via communication unit 128 in accordance with the determination result input from update necessity determination unit 208. In addition, information acquisition unit 200 outputs a control signal for operating output unit 212 to output unit 212.

When data is input from information acquisition unit 200 or sensor 134, dynamic-map generation unit 202 uses the input data to generate a dynamic map as described above with respect to server 106. Dynamic-map generation unit 202 analyzes the input data (sensor data), detects a dynamic object, generates dynamic information of the dynamic object, and incorporates the dynamic information into a dynamic map. Dynamic-map generation unit 202 outputs the generated dynamic map to storage unit 204 to be stored therein. When information acquisition unit 200 receives a dynamic map from server 106, dynamic-map generation unit 202 outputs the dynamic map input from information acquisition unit 200 to storage unit 204 as it is to be stored therein.

Figure 8:
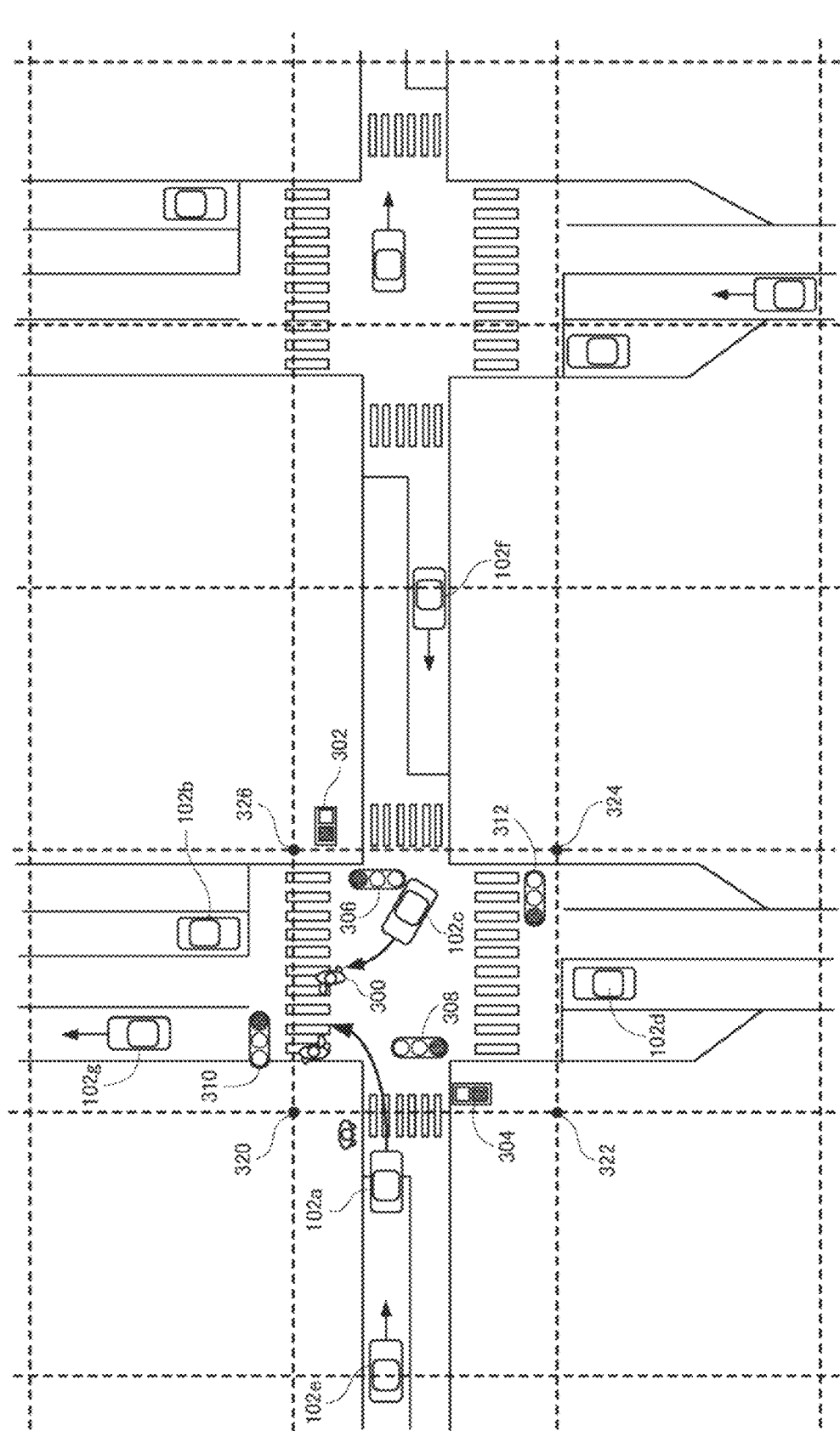
FIG. 8 is a plan view showing an example of a traffic situation.

The grid region and the dynamic map will be described in detail with reference to FIG. 8. FIG. 8 shows states of a vehicle, a pedestrian, and a traffic signal on a road at a certain moment at a certain intersection point. The road corresponds to a road map, and the road map is divided in a grid-like form by a plurality of broken lines. Each rectangular region divided by broken lines (for example, rectangular region having vertices at points 320, 322, 324, and 326) represents one grid region. By dividing the road map into a plurality of small regions (grid regions), generation and update of a dynamic map, which will be described later, are facilitated.

In the grid region specified by points 320 to 326 and grid regions around the grid region, a plurality of traffic signals such as pedestrian signals 302 and 304 (the other pedestrian signals are not shown) and vehicular signals 306 to 312 are installed. A plurality of vehicles 102a to 102g are traveling or stopped. In FIG. 8, the infrastructure sensor is not shown. Pedestrian signal 302, vehicular signal 306, and vehicular signal 308 are in the green lighting state, and pedestrian signal 304, vehicular signal 310, and vehicular signal 312 are in the red lighting state. A plurality of pedestrians 300 cross a crosswalk. An arrow attached to each vehicle indicates a traveling direction. A vehicle to which an arrow is not added is stopped. Vehicle 102a is going to turn left, vehicles 102b and 102d stop at stop lines, and vehicle 102c is turning right. Vehicles 102e, 102f, and 102g are traveling straight ahead.

The vehicle-mounted apparatus and the in-vehicle sensor are mounted on each of the plurality of vehicles 102a to 102g, and sensor data output from the in-vehicle sensor is uploaded to server 106. Sensor data is also uploaded from the infrastructure sensor to server 106. Server 106 communicates with the infrastructure sensor, the vehicle-mounted apparatuses, and the traffic signals to collect information (for example, sensor data). Server 106 analyzes the collected information, detects a pedestrian, a vehicle, and the like as dynamic objects, and stores the dynamic information. For example, by analyzing the image data acquired from the sensor over a predetermined time, the traveling speed (including zero) and the traveling direction can be detected from a change in the position of each vehicle. Similarly, the moving speed and the moving direction of the pedestrian can be detected. In addition, a right or left turn of a vehicle (for example, vehicle 102*a*) can be determined before the vehicle actually changes its direction by detecting a flashing of a direction indicator of the vehicle.

Referring again to FIG. 7, storage unit 204 stores input data and outputs requested data. Storage unit 204 is implemented by memory 142. Storage unit 204 stores a static map (road map) in advance.

Target area identifying unit 206 identifies the current position of vehicle 102*a* from the input positional information. Further, target area identifying unit 206 identifies a specific region (including a plurality of grid regions) including the current position in the dynamic map read from storage unit 204 as a target area for determining whether or not the dynamic map needs to be updated. For example, an area within a predetermined radius around the current position is specified as the target area. Note that the shape of the target area and the method of specifying the target area are arbitrary. The target area may be a rectangular region. In addition, when the vehicle is traveling, the target area may be specified so as to include the front side in the traveling direction more widely and the rear side more narrowly. Information representing the specified target area is output to update necessity determination unit 208.

When the information of the target area is input from target area identifying unit 206, update necessity determination unit 208 reads the dynamic map from storage unit 204 and specifies a plurality of grid regions included in the target area. Furthermore, update necessity determination unit 208 evaluates the degree of freshness of the dynamic map for each specified grid region and determines whether or not the dynamic map needs to be updated. For example, the degree of freshness of the dynamic map is determined by evaluating the degree of freshness of the dynamic information for each dynamic object included in each grid region. For example, the generation time and expiration time of the dynamic information can be used as the degree of freshness of the dynamic information. That is, when one dynamic object is included in the grid region, the determination can be made based on whether or not the current time exceeds the time (hereinafter also referred to as the effective time) obtained by adding the generation time of the dynamic information and the expiration time. When the effective time is not exceeded, it is determined that the update is unnecessary (the degree of freshness of the dynamic map of the grid region is high). When the effective time is exceeded, it is determined that update is necessary (the degree of freshness of the dynamic map of the grid region is low). When a plurality of dynamic objects are included in one grid region, it is determined whether or not the effective time is exceeded for each dynamic object. For at least one piece of dynamic information, when the current time exceeds the effective time, it is determined that the dynamic map of the grid region needs to be updated. For any dynamic information, when the current time does not exceed the effective time, it is determined that the dynamic map of the grid region does not need to be updated. By using the generation time and the expiration time of the dynamic information as the degree of freshness of the dynamic information, it is possible to efficiently determine whether or not the dynamic map needs to be updated.

Even when it is determined that the dynamic object does not exist based on the detection result, the dynamic object does not necessarily exist. If the update time of the dynamic map is old, it may be determined that the dynamic object does not exist even though the dynamic object actually exists. Therefore, for each grid region, the time (hereinafter referred to as the disappearance time) at which all dynamic objects present in the dynamic map of the grid region have disappeared may be included in the degree of freshness. For example, it is determined that the degree of freshness of the dynamic map is low and the dynamic map needs to be updated for a grid region in which the current time exceeds the disappearance time by a predetermined time or more among grid regions each in which the disappearance time exists (grid regions in which it is determined that the dynamic object does not exist). For a grid region in which the current time does not exceeds the disappearance time by a predetermined time or more, the degree of freshness of the dynamic map is high, and it is determined that the dynamic map does not need to be updated. Update necessity determination unit 208 outputs information for specifying the grid region determined to be necessary to be updated (hereinafter referred to as grid region specifying information) to information acquisition unit 200. The grid region specifying information is, for example, coordinates of four vertices of a rectangular grid.

When the dynamic map corresponding to the target area identified by the information received from target area identifying unit 206 does not exist in dynamic maps read from storage unit 204 by update necessity determination unit 208, it is determined that the dynamic map needs to be updated in the grid region. Normally, storage unit 204 (memory 142) does not store dynamic maps for every static map, and the range of the dynamic map required for the automated driving changes depending on the traveling of the vehicle. Therefore, a dynamic map of a range exceeding the currently stored dynamic map may be required. When it is not determined whether the dynamic map needs to be updated, if data is downloaded from server 106 and a dynamic map of a relatively wide area is generated and stored, it is possible to avoid occurrence of a state where a dynamic map corresponding to the target area does not exist.

When the grid region specifying information is input from update necessity determination unit 208, information acquisition unit 200 transmits a data transmission request to which the grid region specifying information and a predetermined request expiration time or a disappearance time corresponding thereto are attached via communication unit 128. This transmission is performed by multicast or broadcast. When a communication address of a partner apparatus (a server, a vehicle-mounted apparatus, an infrastructure sensor, or the like) to which the data transmission is requested is known, multicast may be performed, and when the communication address is unknown, broadcast may be performed. When server 106 stores the dynamic map and vehicle-mounted apparatus 104*a* has periodically received the dynamic map from server 106, the data transmission request may be issued to an apparatus other than server 106 (for example, a vehicle-mounted apparatus, an infrastructure sensor, or the like). The request expiration time is an upper limit time during which data can be effectively used, similarly to the above-described expiration time. Information acquisition unit 200 may set the request expiration time in accordance with the real-time property required by vehicle-mounted apparatus 104*a*.

It is assumed that devices such as vehicle-mounted apparatus 104*b* mounted on vehicles other than vehicle 102*a* and infrastructure sensor 112 manage the expiration time of data (sensor data, analysis result, and the like) acquired by themselves. That is, the expiration time is shortened in accordance with the elapse of time, data that can be effectively used (the expiration time>0) is held, and old data (the expiration time≤0) is discarded. The data transmission request may be received by vehicle-mounted apparatus 104*b*, infrastructure sensor 112, and server 106. The device that has received the data transmission request determines whether or not data (sensor data, dynamic information, or the like) that satisfies the request expiration time included in the data transmission request and is included in the region specified by the grid region information included in the data transmission request is stored in its own memory. Satisfying the request expiration time means, for example, that the expiration time managed by itself is equal to or greater than the request expiration time (the expiration time≥the request expiration time). When receiving the disappearance time, the device that has received the data transmission request determines whether or not data (sensor data, analysis result, or the like) acquired by itself after the disappearance time is stored in its own memory, for example. The device that has determined that the data satisfying the condition is stored transmits information indicating that the data is stored (hereinafter referred to as a transmittable response) to vehicle 102*a*, and information acquisition unit 200 acquires the data used for updating the dynamic map from the device. As described above, information acquisition unit 200 outputs the received data to dynamic-map generation unit 202, and dynamic-map generation unit 202 generates a dynamic map and replaces (updates) the currently stored dynamic map with the dynamic map.

Upon receiving an instruction from information acquisition unit 200, estimation processing unit 210 complements the dynamic map by estimation processing. Information acquisition unit 200 instructs estimation processing unit 210 to execute an estimation processing if the transmittable response is not received within a predetermined time after sending (for example, multicasting) the data transmission request. At this time, information acquisition unit 200 transmits grid region specifying information to estimation processing unit 210. Estimation processing unit 210 reads the dynamic map of the grid region designated by information acquisition unit 200 and the dynamic map of the surrounding grid region from the dynamic information stored in storage unit 204. Furthermore, estimation processing unit 210 estimates the moving path of the dynamic object using the dynamic information included therein, and complements the dynamic map using the estimation result. For example, when the degree of freshness of a particular dynamic information is low (i.e., the degree of freshness exceeds the expiration time or the predetermined time or more elapses from the disappearance time), a future (within the predetermined time from the current time) moving route, moving speed, and the like are estimated using the particular dynamic information (past information). The dynamic map can be complemented by adding these estimation results to the dynamic map. Note that estimation processing unit 210 maintains the current dynamic map for the grid region that cannot be complemented.

Output unit 212 receives an instruction from information acquisition unit 200, reads the updated dynamic map from storage unit 204, and transmits the updated dynamic map to degree-of-freshness determination unit 222 of automated-driving ECU 124. For example, information acquisition unit 200 instructs output unit 212 to output the dynamic map when the update completion of the dynamic map is notified from dynamic-map generation unit 202 (see the dashed arrow) or when the completion of the complementation is notified from estimation processing unit 210 (see the dashed arrow).

[Functional Configuration of Automated-Driving ECU]

As described above, when positional information such as GPS data is input from information acquisition unit 200, planned-travel-section identifying unit 220 uses the positional information to identify the current position of vehicle 102*a* and a planned travel section in the future. For example, when vehicle 102*a* is equipped with a car navigation system and a planned travel route, a destination, and the like are registered, planned-travel-section identifying unit 220 can identify the planned travel section by cooperating with the car navigation system. When neither the planned travel route nor the destination is registered, for example, a road map (static map) is read from storage unit 204, and a travelable range within a predetermined time can be calculated from the current position, the traveling direction, the traveling speed, and the like. Therefore, the travelable range can be identified as the planned travel section. The information identifying the planned travel section is output to degree-of-freshness determination unit 222.

Degree-of-freshness determination unit 222 identifies the planned travel section based on the information input from planned-travel-section identifying unit 220 and identifies a grid region included in the planned travel section. Degree-of-freshness determination unit 222 determines the degree of freshness of the dynamic map corresponding to each identified grid region in the dynamic information input from output unit 212. As described above, the degree of freshness of the dynamic map can be determined using the expiration time and the disappearance time included in the dynamic information included in each grid region. When degree-of-freshness determination unit 222 determines that every dynamic information corresponding to the identified grid region has a high degree of freshness, it outputs the dynamic map input from output unit 212 to travel plan generation unit 224. When it is determined that the degree of freshness of at least one piece of dynamic information is low, degree-of-freshness determination unit 222 does not output (for example, discards) the dynamic map input from output unit 212 to travel plan generation unit 224.

Travel plan generation unit 224 generates a travel plan using the dynamic map input from degree-of-freshness determination unit 222 and the sensor data acquired from sensor 134. The travel plan means a plan related to the position and state of the vehicle over time, which is necessary for determining control information of an automated driving mechanism (an engine, a transmission, a steering wheel, and the like). If the dynamic map is not input from degree-of-freshness determination unit 222, travel plan generation unit 224 generates a travel plan using only the sensor data. The generated travel plan is output to control information generation unit 226.

Control information generation unit 226 generates control information of an automated driving mechanism (an engine, a transmission, a steering wheel, and the like) in accordance with the travel plan input from travel plan generation unit 224 and transmits the control information to the automated driving mechanism to be controlled. As a result, vehicle 102*a* becomes able to travel by automated driving.

Thus, if the degree of freshness of some grid regions has decreased in the stored dynamic map, vehicle-mounted apparatus 104a of vehicle 102a can update the dynamic map corresponding to the grid region. That is, upon determining that the dynamic map needs to be updated, vehicle-mounted apparatus 104a transmits a data transmission request. When the external apparatus such as vehicle-mounted apparatus 104b receives the data transmission request, the external apparatus determines whether or not the stored sensor data or the like satisfies the request, and when the request is satisfied, the external apparatus transmits a transmittable response and the corresponding sensor data or the like to vehicle-mounted apparatus 104a. Accordingly, vehicle-mounted apparatus 104a can update the dynamic map used for automated driving using the data received from the external apparatus. When the degree of freshness of the dynamic map decreases, it is difficult to perform the automated driving control using the dynamic map, and thus the automated driving cannot be performed. However, since the degree of freshness of the dynamic map can be maintained in a high state by updating the dynamic map as described above, vehicle 102a can perform automated driving with high reliability.

[Operation of Vehicle Inside-Outside Coordination Unit]

Figure 9:
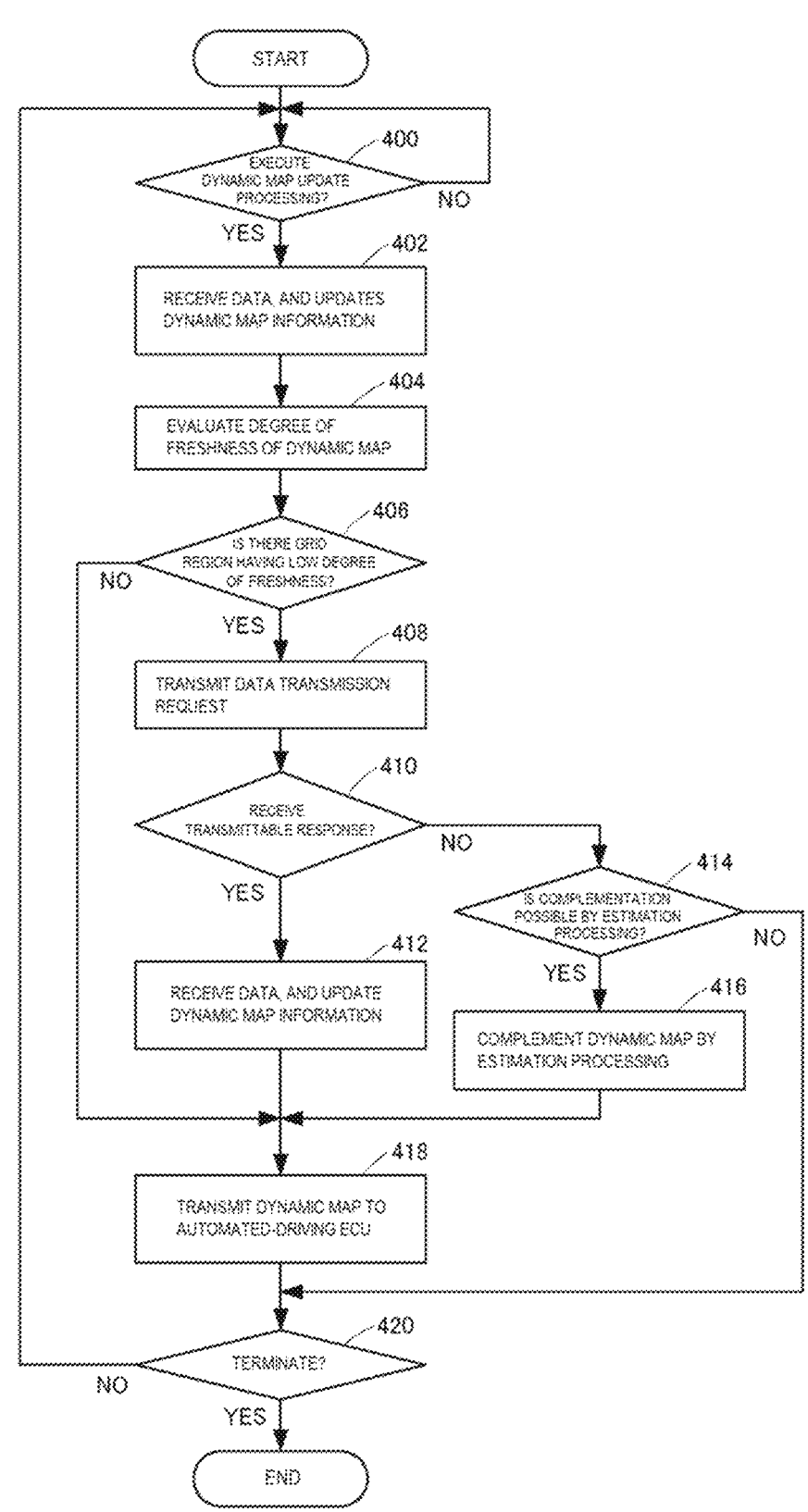
FIG. 9 is a flowchart showing processing of a vehicle inside-outside coordination unit.

Referring to FIG. 9, the processing by vehicle inside-outside coordination unit 120 will be described in more detail with reference to the functions shown in FIG. 7. The processing shown in FIG. 9 is realized by control unit 140 reading a predetermined program from memory 142 and executing the program. Here, it is assumed that server 106 transmits stored dynamic driving assistance information (dynamic map, analysis result, sensor data, and the like) in response to a request from the outside.

In a step 400, control unit 140 determines whether or not to execute a dynamic map update processing. For example, when the update is performed at a constant period, control unit 140 determines whether or not the update processing is to be executed by determining whether or not the update period has elapsed from the previous update time. When it is determined that the update processing is to be executed, the control proceeds to a step 402. Otherwise, step 400 is repeated. Note that the timing at which the update processing is executed (for example, the update time in one day) may be set in advance.

In step 402, control unit 140 updates the dynamic map using the sensor data output from sensor 134 and the data acquired from server 106. For example, control unit 140 requests server 106 so as to receive data (dynamic driving assistance information) from server 106 for generating a dynamic map. This corresponds to the functions of information acquisition unit 200 and dynamic-map generation unit 202 described above. The generated dynamic map is stored in memory 142. When the dynamic map itself is received, control unit 140 stores the dynamic map in memory 142 as it is. Thereafter, the control proceeds to a step 404.

In step 404, control unit 140 evaluates the degree of freshness of the dynamic map. Specifically, control unit 140 identifies a target area for determining the necessity of updating the dynamic map with reference to the current position of vehicle 102a (corresponding to the function of target area identifying unit 206). Control unit 140 reads the dynamic map corresponding to the target area from memory 142, and evaluates the degree of freshness of the dynamic map corresponding to each grid region as described above (corresponding to the function of update necessity determination unit 208). The evaluation result for each grid region is temporarily stored in memory 142. For example, control unit 140 stores the grid region specifying information (for example, coordinates of four vertices) in memory 142 only for a grid region having a low degree of freshness (ignores a grid region having a high degree of freshness). Thereafter, the control proceeds to a step 406.

In step 406, control unit 140 determines whether or not there is a dynamic map having a low degree of freshness. Specifically, control unit 140 reads out the grid region specifying information stored in step 404 from memory 142. When the grid identification information can be read (when the grid specifying information exists), it is determined that there is a dynamic map having a low degree of freshness, and the control proceeds to a step 408. Otherwise, i.e., when the grid identification information cannot be read out (when there is no grid identification information), it is determined that there is no dynamic map having a low degree of freshness, and the control proceeds to a step 418.

In step 408, control unit 140 transmits a data transmission request to the external apparatus as described above (corresponding to the function of information acquisition unit 200). The grid region specifying information and the request expiration time or the disappearance time corresponding thereto are added to the data transmission request. Thereafter, the control proceeds to a step 410.

In step 410, control unit 140 determines whether or not a transmittable response has been received from the external apparatus (corresponding to the function of information acquisition unit 200). When it is determined that it has been received, the control proceeds to a step 412. Otherwise, control passes to a step 414.

In step 412, as described above, control unit 140 receives data from the external apparatus from which the transmittable response has been received (corresponding to the function of information acquisition unit 200), and updates the dynamic map using the data (corresponding to the function of dynamic-map generation unit 202). Note that control unit 140 may request the apparatus that has transmitted the transmittable response to transmit data. The address of the apparatus that has transmitted the transmittable response can be identified by the source address included in the packet in which the transmittable response has been included. Thereafter, the control proceeds to step 418.

On the other hand, in step 414, control unit 140 determines whether or not the dynamic map whose degree of freshness is determined to be low can be complemented by estimation processing. As described above, the estimation processing is a processing of generating dynamic information after the current time by using past dynamic information. Therefore, unless appropriate dynamic information usable for the estimation processing is stored in memory 142, the complementation by the estimation processing cannot be performed. When it is determined that complementation is possible, the control proceeds to a step 416. Otherwise, control passes to a step 420.

In step 416, control unit 140 complements the dynamic map by estimation processing. Specifically, control unit 140 generates future dynamic information (within a predetermined time T from the current time) using dynamic information included in each grid region and its surrounding grid regions with respect to a grid region determined to have a low degree of freshness. Control unit 140 generates data such as a trajectory and a speed change of the dynamic object and incorporates them into the corresponding dynamic map. Further, control unit 140 incorporates, for example, the time T into the dynamic map as the expiration time of the generated dynamic information. Thereafter, the control proceeds to step 418.

In step 418, control unit 140 transmits the dynamic map updated in step 412 or step 416 to automated-driving ECU 124 via bus 132. This corresponds to the functions of information acquisition unit 200 and output unit 212 described above.

In step 420, control unit 140 determines whether or not an end instruction has been received. If it is determined that the end instruction has been received, the program ends. Otherwise, control returns to step 400 and the processing described above is repeated. The end instruction is issued, for example, by turning off the power supply mounted on vehicle 102a.

Accordingly, vehicle inside-outside coordination unit 120 can dynamically update the dynamic map and maintain the dynamic map with a high degree of freshness. When vehicle inside-outside coordination unit 120 cannot acquire dynamic information having a high degree of freshness from the server, vehicle inside-outside coordination unit 120 may acquire necessary data from other apparatus, for example, an infrastructure sensor and a surrounding vehicle-mounted apparatus, and update the dynamic map. In addition, even when necessary data cannot be acquired from server 106 or other apparatuses, the dynamic map can be complemented by the estimation processing. Therefore, the degree of freshness of the dynamic map can be maintained in a high state, and highly reliable automatic driving can be realized.

[Operation of Automated-Driving ECU]

Figure 10:
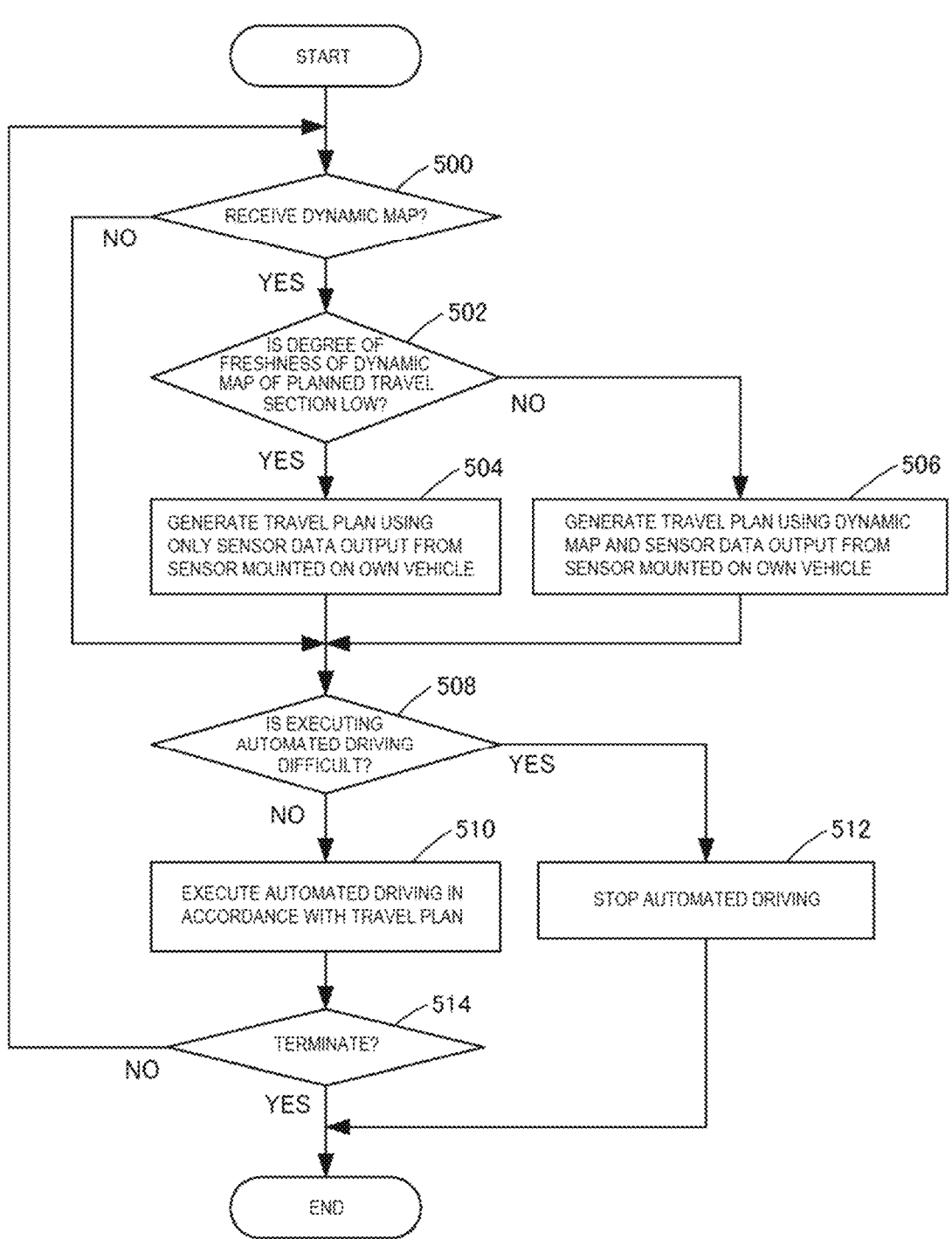
FIG. 10 is a flowchart showing processing of the automated-driving ECU.

Referring to FIG. 10, the processing by automated-driving ECU 124 will be described in more detail with reference to the functions shown in FIG. 7. The processing shown in FIG. 10 is realized by control unit 150 shown in FIG. 4 reading out a predetermined program from memory 152 and executing it.

In a step 500, control unit 150 determines whether or not a dynamic map has been received from vehicle inside-outside coordination unit 120. When it is determined that it has been received, the control proceeds to a step 502. Otherwise, control passes to a step 508.

In step 502, control unit 150 determines whether or not the degree of freshness of the dynamic map corresponding to the planned travel section is low. This corresponds to the functions of planned-travel-section identifying unit 220 and degree-of-freshness determination unit 222. When it is determined that the degree of freshness is low, the control proceeds to a step 504. Otherwise, control passes to a step 506.

In step 504, control unit 150 generates a travel plan without using the dynamic map received in step 500. For example, control unit 150 generates a travel plan using only the sensor data output from sensor 134 mounted on vehicle 102a (own vehicle). This corresponds to the function of travel plan generation unit 224 described above. Thereafter, the control proceeds to step 508.

On the other hand, in step 506, control unit 150 generates a travel plan using the dynamic map received in step 500. For example, control unit 150 generates a travel plan using the sensor data output from sensor 134 mounted on vehicle 102a (own vehicle) and the dynamic map. This corresponds to the function of travel plan generation unit 224 described above. Thereafter, the control proceeds to step 508.

In step 508, control unit 150 determines whether or not it is difficult to execute automated driving. When the automated driving cannot be safely performed (for example, when there is a blind spot), it is determined that it is difficult.

If it is determined that be difficult, the control proceeds to a step 512. Otherwise, control passes to a step 510.

In step 510, control unit 150 executes automated driving in accordance with the travel plan generated in step 504 or 506. When the automated driving is already being executed, the automated driving is continued. Specifically, control unit 150 generates control information for controlling the automated driving mechanism in accordance with the travel plan, and transmits the control information to the automated driving mechanism. This corresponds to the function of control information generation unit 226 described above.

On the other hand, in step 512, control unit 150 does not perform automated driving. When the automated driving is already executed, control unit 150 stops the automated driving. For example, control unit 150 switches to automated driving by remote control or manual driving. Control unit 150 may move vehicle 102a to a safe position and stop it.

In a step 514, control unit 150 determines whether or not an end instruction has been received. When it is determined that the end instruction has been received, the program ends. Otherwise, control returns to step 500 and the processing described above is repeated. The end instruction is issued, for example, by turning off the power supply mounted on vehicle 102a.

As a result, automated-driving ECU 124 can generate control data for executing automated driving using a dynamic map having a high degree of freshness, and thus highly reliable automated driving can be realized. When the degree of freshness of the dynamic map is low, the dynamic map is not used. Therefore, it is possible to avoid performing unreasonable automated driving. In addition, it is possible to avoid unnecessary processing by automated-driving ECU 124, unnecessary communication of inside vehicle-mounted apparatus 104a can be reduced, and the storage capacity can be reduced.

Figure 11:
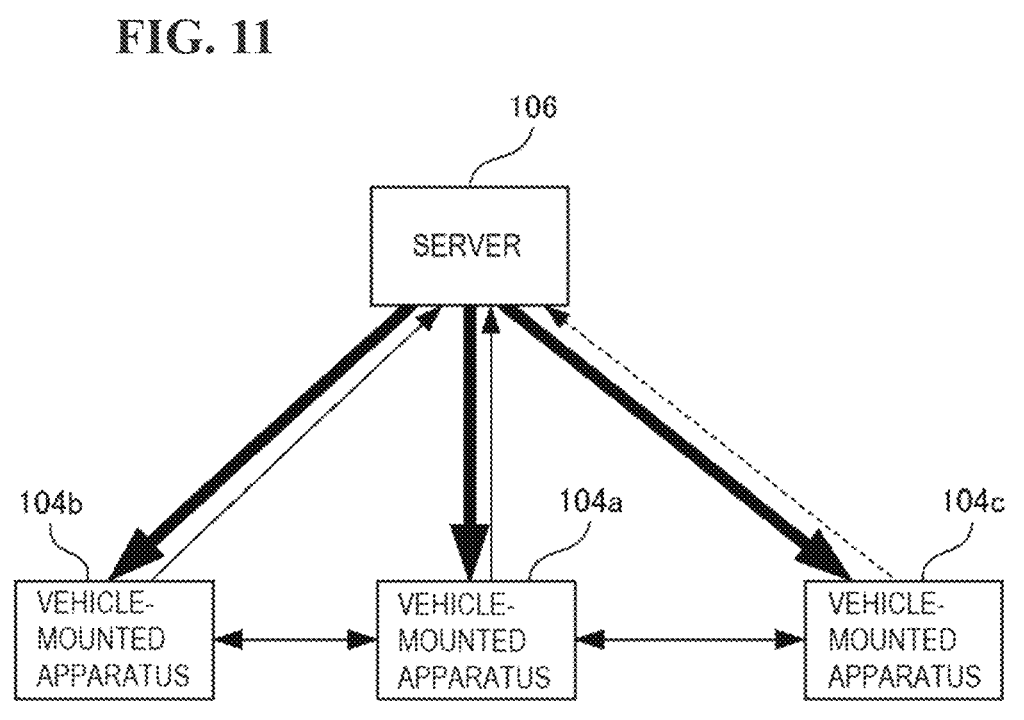

Referring to FIG. 11, normally, server 106 analyzes sensor data uploaded from vehicle-mounted apparatuses 104a, 104b, and 104c and infrastructure sensor 112 (not shown in FIG. 11), generates a dynamic map, and periodically transmits the dynamic map to vehicle-mounted apparatuses 104a, 104b, and 104c as dynamic driving assistance information. In FIG. 11, a thick arrow indicates downloading of a dynamic map or the like, and a thin arrow indicates uploading of sensor data or the like. The difference in communication band (communication speed) is indicated by the width of the arrow.

For example, when communication between vehicle-mounted apparatus 104c and server 106 becomes difficult, or when it takes a long time to upload data from vehicle-mounted apparatus 104c (indicated by a dashed arrow in FIG. 11), a situation in which server 106 cannot generate a dynamic map with a high degree of freshness may occur. In such a situation, for example, server 106 can deliver only a dynamic map having a low degree of freshness, and vehicle-mounted apparatus 104a cannot appropriately update the stored dynamic map, so that the degree of freshness of the dynamic map decreases. In this state, there is a possibility that a problem occurs in the automated driving (for example, the automated driving cannot be executed). In such a situation, vehicle-mounted apparatus 104a can receive necessary data from apparatuses other than server 106 (vehicle-mounted apparatus 104b, vehicle-mounted apparatus 104c, and infrastructure sensor 112) and update the dynamic map by transmitting (for example, multicasting) a data transmission request, as described above. Therefore, vehicle-mounted apparatus 104a can avoid occurrence of a problem in automated driving and can continue automated driving with high reliability.

As a conventional driving assistance system, an aggregation processing type system has been proposed and realized. In the aggregation processing type system, data (sensor data or the like) is aggregated in a single server, and the latest dynamic map is constructed in the server. The dynamic map is transmitted from the server to the vehicle-mounted apparatus. On the other hand, a distributed processing system has been proposed, and it is expected that the distributed processing system will become widespread in the future. In the distributed processing system, data processing is shared among a plurality of servers and a plurality of vehicle-mounted apparatuses, and a dynamic map is also constructed in a distributed manner. The present disclosure can provide a technique necessary for a driving assistance system of a distributed processing type.

The processing of vehicle inside-outside coordination unit 120 shown in FIGS. 9 and 10 may be modified and executed as appropriate. For example, the case where the estimation processing is executed (step 416) and then the processing of transmitting the dynamic map to automated-driving ECU 124 is executed (step 418) has been described, but the present disclosure is not limited thereto. Even when it is determined in step 414 that estimation is possible and estimation processing is executed, there is a possibility that the dynamic map is not sufficiently complemented. Therefore, it is preferable to modify the flow chart shown in FIG. 9 as shown in FIG. 12. The flowchart shown in FIG. 12 is obtained by adding a step 430 to the flowchart shown in FIG. 9. Therefore, the description will not be repeated, and different points will be described.

In step 430, control unit 140 determines the degree of freshness of the complemented dynamic map. When it is determined that the degree of freshness of the complemented dynamic map is low, control unit 140 discards the complemented dynamic map, and the control proceeds to step 420. Otherwise (when the degree of freshness of the complemented dynamic map is high), the control proceeds to step 418. As a result, it is possible to prevent the insufficient complemented dynamic map from being transmitted to automated-driving ECU 124, and automated driving with high reliability can be realized. In addition, wasteful processing by automated-driving ECU 124 can be avoided, wasteful communication inside vehicle-mounted apparatus 104a can be reduced, and the storage capacity can be reduced.

First Modification

In the above description, the case where the vehicle-mounted apparatus updates the dynamic map according to the degree of freshness of the dynamic map, uses the updated dynamic map in the automated-driving ECU of the own vehicle, and reflects the updated dynamic map in the automated driving has been described, but the present disclosure is not limited thereto. In the first modification, the vehicle-mounted apparatus that has updated the dynamic map transmits the updated dynamic map to vehicle-mounted apparatuses of other vehicles in addition to using the updated dynamic map in the own vehicle.

Figure 7:
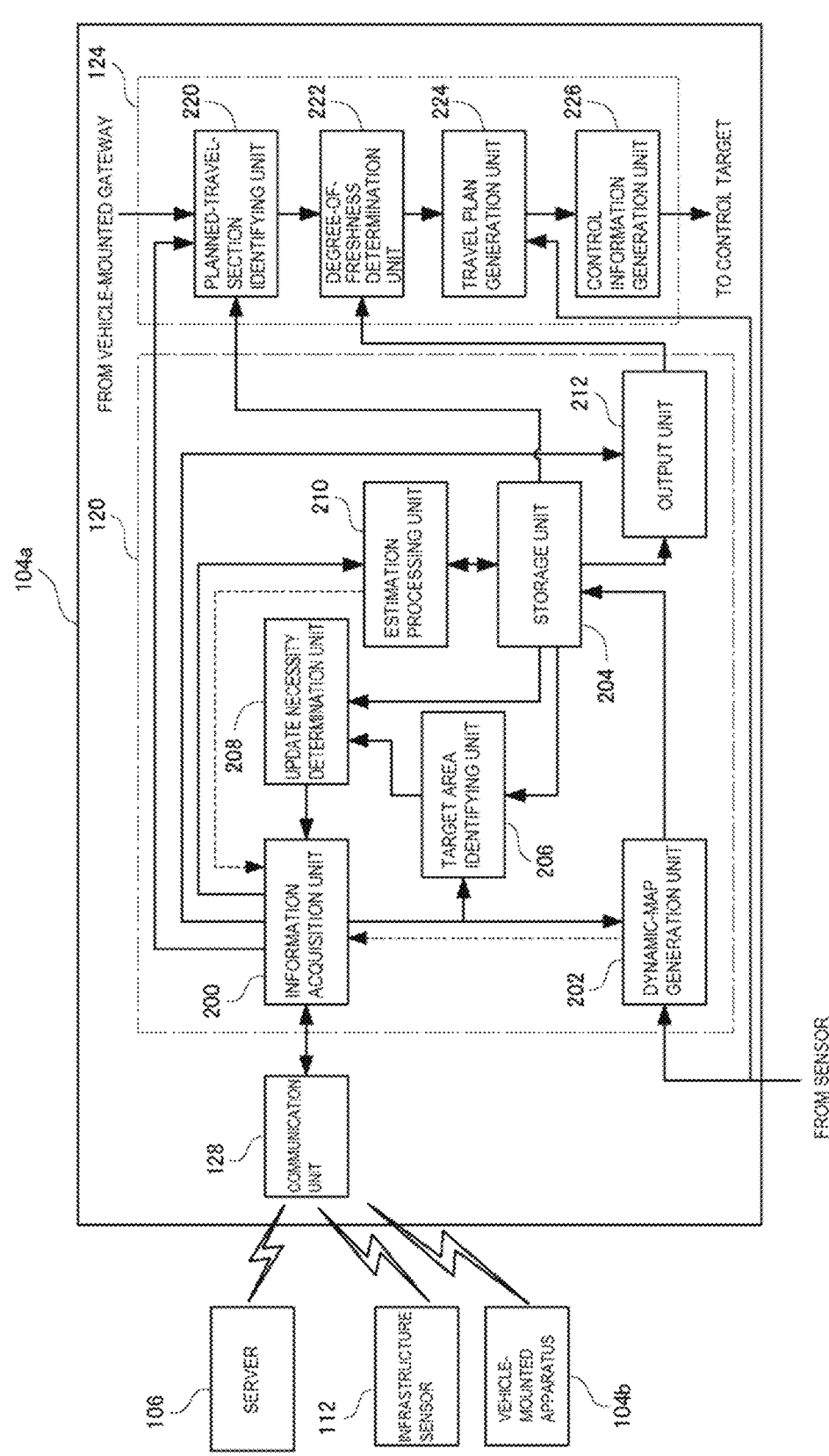
FIG. 7 is a block diagram showing functional configurations of a vehicle inside-outside coordination unit and an automated-driving ECU.

The entire system and the configuration of each component are the same as those in FIGS. 1 to 6. In addition, functions of vehicle-mounted apparatuses (a vehicle inside-outside coordination unit and an automated-driving ECU)

are the same as those of FIG. 7. A different point is that vehicle-mounted apparatus 104a transmits the updated dynamic map to the outside.

Figure 13:
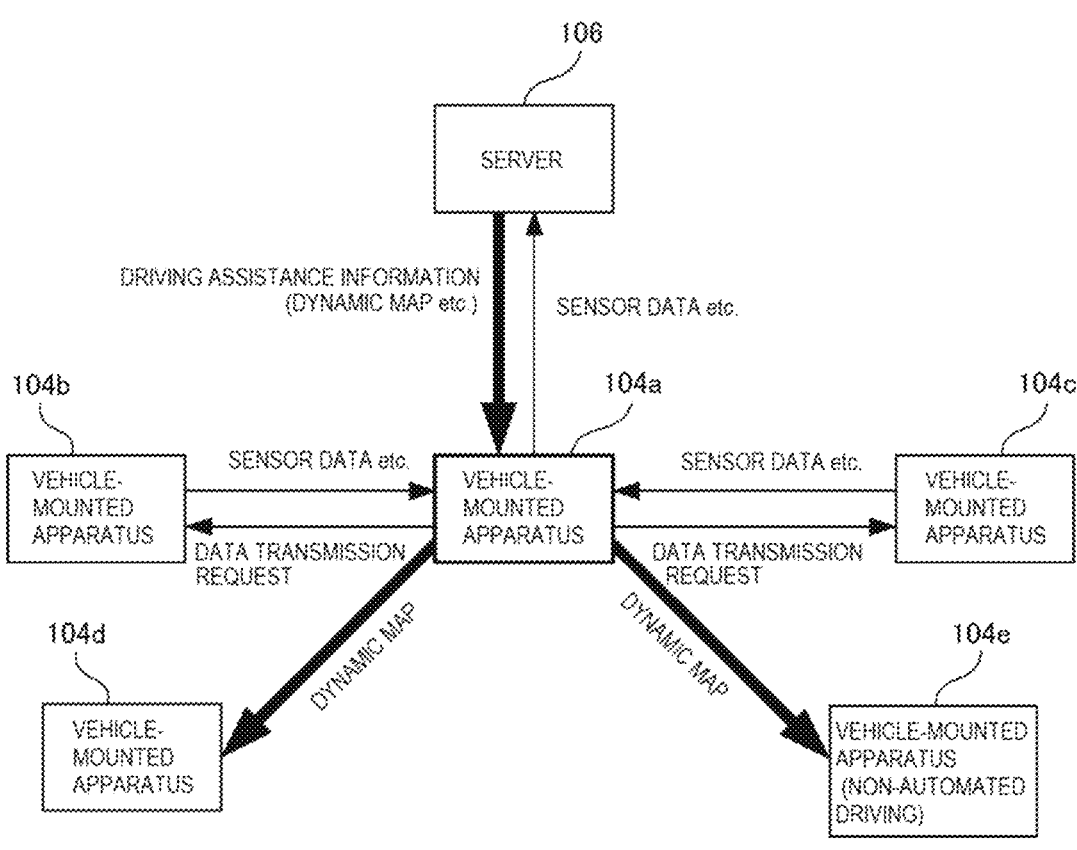
FIG. 13 is a block diagram showing transmission and reception of data between a plurality of vehicle-mounted apparatuses and a server, which is different from FIG. 11.

Specifically, as shown in FIG. 13, data is transmitted and received between the server and the vehicle-mounted apparatus. That is, referring to FIG. 7, in vehicle-mounted apparatus 104a, as described above, vehicle inside-outside coordination unit 120 (information acquisition unit 200) transmits a data transmission request. For example, vehicle-mounted apparatuses 104b and 104c receive the data transmission request and transmit the data to vehicle-mounted apparatus 104a. Vehicle-mounted apparatus 104a updates the dynamic map using the received data. As described above, the updated dynamic map is transmitted to automated-driving ECU 124 of the own vehicle (vehicle-mounted apparatus 104a), and is used for the automated driving of the own vehicle by automated-driving ECU 124. In addition, vehicle-mounted apparatus 104a (vehicle inside-outside coordination unit 120) reads the updated dynamic map from storage unit 204 (memory 142) and transmits the updated dynamic map through communication unit 128. The transmission may be multicast or broadcast. Vehicle-mounted apparatus 104a (vehicle inside-outside coordination unit 120) may transmit updated dynamic information to an external apparatus in response to a request from the external apparatus.

A vehicle-mounted apparatus 104d does not include a vehicle inside-outside coordination unit, but includes an automated-driving ECU and has an automated driving function. Vehicle-mounted apparatus 104d receives the updated dynamic map from vehicle-mounted apparatus 104a, and uses the dynamic map for automated driving of the own vehicle. Therefore, the vehicle on which vehicle-mounted apparatus 104d is mounted can perform automated driving with high reliability.

On the other hand, a vehicle-mounted apparatus 104e that does not have the automated driving function also receives the updated dynamic map from vehicle-mounted apparatus 104a. Vehicle-mounted apparatus 104e cannot use the received dynamic map for automated driving, but can use the dynamic map to present information serving as driving assistance. For example, when the dynamic information of the dynamic object is included in the dynamic map, it is possible to present, on the mounted display, the fact that the dynamic object (pedestrian or the like) exists in the vicinity of the own vehicle, the estimated route of the dynamic object, and the like. Also, the presence of the dynamic object may be warned by an acoustic device. Therefore, highly reliable driving assistance can be realized.

In the above description, the case where vehicle-mounted apparatus 104a uses the updated dynamic map in the own vehicle (vehicle 102a) and also transmits the updated dynamic map to the vehicle-mounted apparatuses of the other vehicles has been described, but the updated dynamic map may not be used in the own vehicle. Since vehicle-mounted apparatus 104a transmits the updated dynamic map to the vehicle-mounted apparatuses of the other vehicles (vehicle-mounted apparatuses 104d, 104e, and the like), each vehicle can use the dynamic map for automated driving or driving assistance as described above.

Second Modification

Although the case where the vehicle-mounted apparatus updates the dynamic map in accordance with the degree of freshness of the dynamic map has been described above, the present disclosure is not limited thereto. In the second modification, an apparatus (server, road-side device, or the like) other than the vehicle-mounted apparatus updates the dynamic map in accordance with the degree of freshness of the dynamic map.

The entire system and the configuration of each component are the same as those in FIGS. 1 to 6. In addition, functions of vehicle-mounted apparatuses (a vehicle inside-outside coordination unit and an automated-driving ECU) are the same as those of FIG. 7. A different point is that an apparatus other than the vehicle-mounted apparatus has the function shown in FIG. 7 of updating the dynamic map according to the degree of freshness of the dynamic map.

Figure 14:
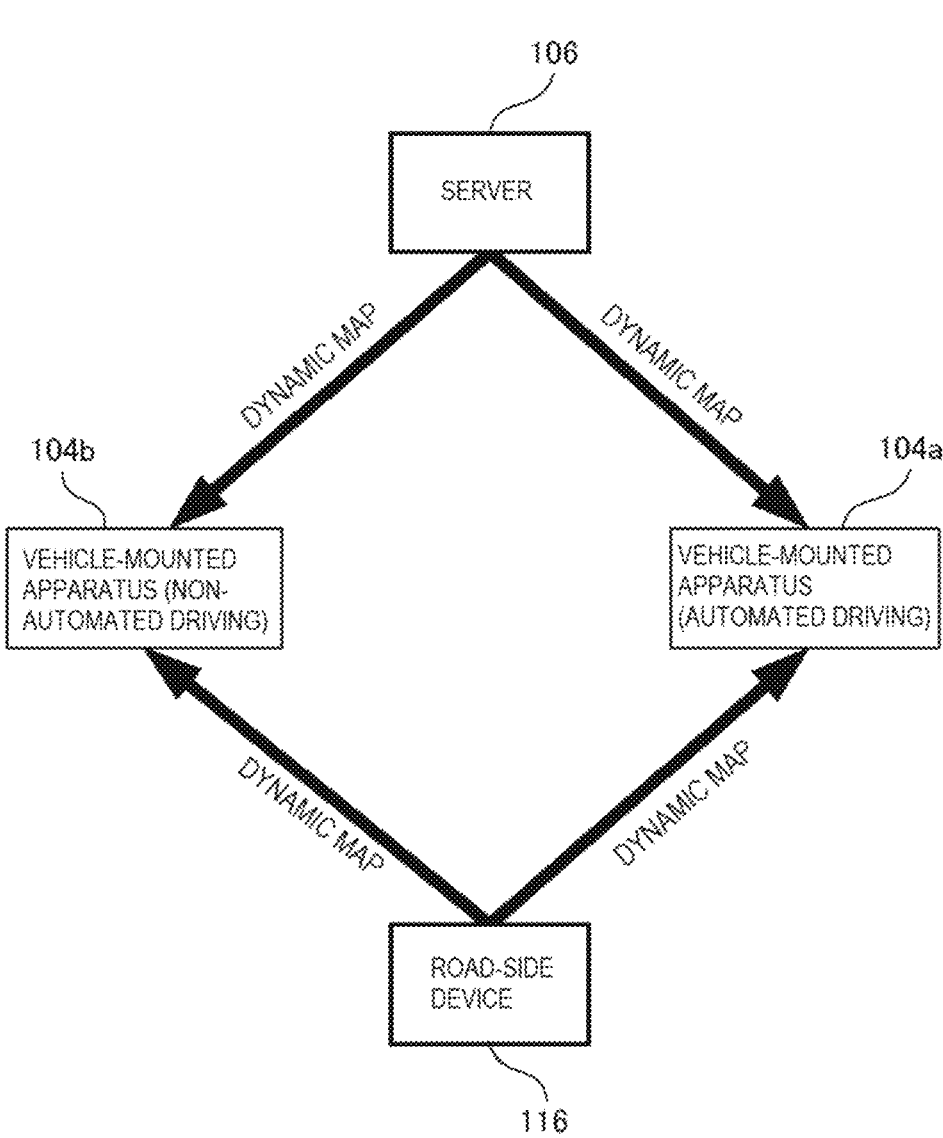
FIG. 14 is a block diagram showing transmission and reception of data between a plurality of vehicle-mounted apparatuses and a server, which is different from FIGS. 11 and 13.

Specifically, as shown in FIG. 14, data is transmitted and received between the vehicle-mounted apparatus and the external apparatuses. Server 106 receives sensor data and the like from the outside, analyzes the sensor data, generates a dynamic map, and stores the dynamic map. Server 106 transmits the stored dynamic map to vehicle-mounted apparatuses 104a and 104b as appropriate. Like server 106, a road-side device 116 also generates a dynamic map and transmits the dynamic map to vehicle-mounted apparatuses 104a and 104b. That is, each of server 106 and road-side device 116 function as an information distribution apparatus. Here, it is assumed that vehicle-mounted apparatus 104a has an automated-driving ECU and is capable of automated driving, but does not have a vehicle inside-outside coordination unit and does not have a function of updating the dynamic map in accordance with the degree of freshness of the dynamic map. Vehicle-mounted apparatus 104a uses the dynamic map received from server 106 and road-side device 116 for automated driving of the own vehicle. On the other hand, it is assumed that vehicle-mounted apparatus 104b does not include an automated-driving ECU and is incapable of automated driving. Vehicle-mounted apparatus 104b presents information for driving assistance by using the received dynamic map.

Although the function of server 106 will be described below, road-side device 116 also has the same function. As described above with reference to FIG. 7, server 106 evaluates the degree of freshness of the dynamic map stored therein, and transmits a data transmission request when it is determined that there is a grid region in which the degree of freshness has decreased. As described above, the data transmission request includes the grid region specifying information and the request expiration time or the disappearance time corresponding thereto, and the transmission can be performed by multicast or broadcast. Since server 106 is fixed at a place where it is installed, it manages a dynamic map within a predetermined range based on its own installation place.

Infrastructure sensor 112 and the vehicle-mounted apparatus (here, vehicle-mounted apparatuses other than vehicle-mounted apparatuses 104a and 104b) receive the data transmission request, and transmit sensor data and the like to the apparatus (server 106) that has transmitted the data transmission request. Server 106 updates the dynamic map using the received data, and stores the dynamic map with a high degree of freshness. Further, server 106 transmits the updated dynamic map (a dynamic map with a high degree of freshness). The transmission may be multicast or broadcast. Server 106 can receive a request from a vehicle-mounted apparatus and transmit updated dynamic information to the vehicle-mounted apparatus.

Since vehicle-mounted apparatus 104a includes the auto-mated-driving ECU, when the transmitted dynamic map (dynamic map with a high degree of freshness) is received from server 106, the received dynamic map is input to the automated-driving ECU and used for automated driving. Therefore, the vehicle on which vehicle-mounted apparatus 104a is mounted can perform automated driving with higher reliability.

On the other hand, vehicle-mounted apparatus 104b that does not have the automated driving function also receives the updated dynamic map (dynamic map having a high degree of freshness) from server 106. Vehicle-mounted apparatus 104b cannot use the received dynamic map for automated driving, but can use the dynamic map to present information for driving assistance. That is, if the dynamic information of the dynamic object is included in the dynamic map, for example, the presence of the dynamic object (pedestrian or the like) in the vicinity of the vehicle, the estimated path of the dynamic object, and the like can be presented on the mounted display, and the presence of the dynamic object can be warned by the acoustic device.

Although a rectangular grid region obtained by dividing the road map in a grid-like form is assumed in the above description, the present disclosure is not limited to this. The road map may be divided into a plurality of small regions, and the size and shape of the divided small regions are arbitrary and may not be the same. In addition, the dynamic map is not necessary in the first place for an area where the vehicle is prohibited from traveling or an area where the vehicle cannot travel. Therefore, only the region in which the vehicle can travel may be divided into a plurality of small regions, and the dynamic map may be generated and updated for each small region.

In the above description, the degree of freshness is evaluated using time information such as the expiration time included in the dynamic map. Accordingly, the updated dynamic map or the complemented dynamic map transmitted from vehicle inside-outside coordination unit 120 to automated-driving ECU 124 also includes time information such as the expiration time. However, the present disclosure is not limited thereto. For example, in step 418, before the updated dynamic map or the complemented dynamic map is transmitted to automated-driving ECU 124, the degree of freshness may be evaluated and the evaluation result (for example, a label corresponding to the degree of freshness) may be added. Accordingly, automated-driving ECU 124 can more easily perform the determination processing of the degree of freshness in step 502.

In the above description, the case where whether or not the dynamic map has been updated is determined in accordance with the degree of freshness of the dynamic map for each grid region has been described. However, the index of determination is not limited to the degree of freshness. Any index representing the accuracy (the degree of certainty) of the dynamic map may be used. It is not preferable to use a dynamic map with a low degree of certainty for automated driving. For example, whether or not the dynamic map is updated may be determined in accordance with the precision (coarseness) of the dynamic map for each grid region. That is, the degree of certainty includes the degree of freshness and preciseness. The precision of the dynamic map for each grid region means the precision of the dynamic information included in the grid region. As described above, the dynamic information includes information (including a temporal change, for example, a trajectory) on a position, a speed, and a moving direction (traveling direction) of a dynamic object (a person, a vehicle, or the like) detected by analyzing the sensor data. The dynamic information is not limited to an analysis result of past data, and may include estimation information.

The precision of dynamic information depends on the detection performance of a sensor, its surrounding environment, and the like. That is, the precision is a function of the detection performance of the sensor and the environmental conditions. The detection performance includes the performance of the sensor itself, and when the estimation information is generated, the detection performance includes the processing capability of an engine (software) that processes sensor data and estimates a change (movement or the like) of a dynamic object. The environmental conditions include factors that affect the detection performance of the sensor, such as climate conditions (weather (fine weather, rainy weather, cloudy weather, fog, and the like), temperature, humidity, and the like), sunshine conditions, and the like. For example, the precision may be determined in advance in consideration of the product number of the sensor and the environmental conditions when the sensor data is acquired, and may be stored in the form of a table or the like. In the case of estimation, the precision may be determined in advance in consideration of the type of engine to be used in addition to the above factors. When the sensor data is uploaded, information capable of specifying the product number of the sensor and the environmental conditions at that time are also uploaded. By doing so, the server or the like can add the precision to the received sensor data or the analysis result (dynamic information) obtained by analyzing the received sensor data by referring to the table storing the accuracy. In addition, the server or the like can add precision to an analysis result (dynamic information) in consideration of an engine used for estimation processing by the server or the like. When the server or the like transmits the sensor data and the dynamic information, the server or the like transmits the sensor data and the dynamic information with precision added thereto.

When the vehicle-mounted apparatus generates a dynamic map for each grid region using the sensor data, the dynamic information, and the like received from the server or the like, the vehicle-mounted apparatus adds the precision of the dynamic information to the generated dynamic map and stores the dynamic map. Thus, the vehicle-mounted apparatus can compare the precision of the dynamic information included in each grid region with a predetermined threshold value, thereby determining whether or not the dynamic map of the grid region has been updated. For example, when the precision of all pieces of dynamic information included in the dynamic map of the grid region is higher than the threshold value (degree of certainty (precision) is high), the vehicle-mounted apparatus determines that the dynamic map does not need to be updated. On the other hand, when the precision of at least one dynamic information among the dynamic information included in the dynamic map of the grid region is equal to or less than the threshold value (degree of certainty (precision) is low), it is determined that the dynamic map corresponding to the grid region needs to be updated. Thus, as in the case where the degree of freshness is used as an index for determination, the vehicle-mounted apparatus can transmit a data transmission request as necessary. In this case, instead of the requested expiration time, a degree of precision requirement (requested effective precision) may be added to the data transmission request. As a result, the apparatus that has received the data transmission request determines whether or not the sensor data or the like stored therein satisfies the request (request effective precision), and when the request is satisfied, the apparatus can transmit the transmittable response and the sensor data or the like. Therefore, the vehicle-mounted apparatus that has transmitted the data transmission request can update the dynamic map using the data received from the external apparatus, and can realize highly reliable automated driving using the updated dynamic map with high precision.

Note that the present disclosure is not limited to the case where one degree of certainty (for example, only one of precision and degree of freshness) is used as an index. A plurality of degrees of certainty (for example, precision and degree of freshness) may be used as indices to determine whether or not the dynamic map is updated in accordance with the degrees of certainty of the dynamic map for each grid region. In the case of using a plurality of degrees of certainty, for example, when at least one degree of certainty is low, it may be determined that the dynamic map needs to be updated, and when all the degrees of certainty are high, it may be determined that the dynamic map does not need to be updated.

In the above description, the case in which the degree of freshness of the dynamic information contained in the dynamic map corresponding to the grid region is used as an index to determine whether or not the dynamic map needs to be updated, and the present disclosure is not limited to this case. For example, the time at which the dynamic map corresponding to the grid region is updated last may be adopted as the degree of freshness. That is, the degree of freshness may be the latest update time of the dynamic map corresponding to the grid region. In this case, one index (latest update time) is stored in association with one grid region. By doing so, the necessity of updating the dynamic map can be determined by comparing the elapsed time from the latest update time to the present time with a predetermined threshold value (expiration time of the dynamic map). For example, when the elapsed time is equal to or greater than the threshold value, it is determined that the dynamic map needs to be updated, and when the elapsed time is less than the threshold value, it is determined that the dynamic map does not need to be updated. Therefore, it is possible to more easily determine whether the dynamic map needs to be updated.

As described above, each functional block shown in FIG. 7 may be implemented by hardware, software, or a mixture thereof. In order to realize using hardware, an ASIC or the like that executes some or all of the processes (for example, the processes shown in FIGS. 9 and 11) executed by vehicle inside-outside coordination unit 120 and automated-driving ECU 124 may be used.

In addition, it is possible to provide a recording medium in which a program for causing a computer to execute processes (for example, the processes shown in FIGS. 9 and 10) executed by vehicle inside-outside coordination unit 120 and automated-driving ECU 124 is recorded. The storage medium is, for example, an optical disc (such as a Digital Versatile Disc (DVD)) or a removable semiconductor memory (such as a Universal Serial Bus (USB) memory). The computer program may be transmitted via a communication line, and the recording medium means a non-transitory recording medium. By causing the computer to read the program stored in the recording medium, as described above, the computer can update the dynamic map in accordance with the degree of certainty of the dynamic map, generate a dynamic map with a high degree of certainty, and use the dynamic map for automated driving and driving assistance.

Although the present disclosure has been described above by describing the embodiment, the above-described embodiment is an example, and the present disclosure is not limited to only the above-described embodiment. The scope of the present disclosure is defined by the appended claims and includes all changes that come within the meaning and range of equivalency of the words recited in the claims when read in conjunction with the description of the invention.

DESCRIPTION OF SYMBOLS

100 driving assistance system
102*a*, 102*b*, 102*c*, 102*d*, 102*e*, 102*f*, 102*g* vehicle
104*a*, 104*b*, 104*c*, 104*d*, 104*e* vehicle-mounted apparatus
106 server
108 base station
110 network
112 infrastructure sensor
114 traffic signal
116 road-side device
120 vehicle inside-outside coordination unit
122 vehicle-mounted gateway
124 automated-driving ECU
126, 154, 176 I/F unit
128, 164, 174 communication unit
130, 132, 166, 180 bus
134, 178 sensor
140, 150, 160, 170 control unit
142, 152, 162, 172 memory
200 information acquisition unit
202 dynamic-map generation unit
204 storage unit
206 target area identifying unit
208 update necessity determination unit
210 estimation processing unit
212 output unit
220 planned-travel-section identifying unit
222 degree-of-freshness determination unit
224 travel plan generation unit
226 control information generation unit
300 pedestrian
302, 304 pedestrian signal
306, 308, 310, 312 vehicular signal
320, 322, 324, 326 point
400, 402, 404, 406, 408, 410, 412, 414, 416, 418, 420, 430, 500, 502, 504, 506, 508, 510,
512, 514 step
The invention claimed is:

1. A vehicle-mounted apparatus comprising:
processing circuitry configured to:
receive data from an outside;
generate, from the data, dynamic maps in each of which dynamic information regarding a dynamic object is associated with a static map, the generating the dynamic maps including generating, from the data, a generation time of the dynamic information and generating, from the data, an expiration time of the dynamic information, the dynamic information including the generation time of the dynamic information and the expiration time of the dynamic information,
store the dynamic maps and the static map;
calculate an effective time by adding the generation time and the expiration time;
determine a degree of freshness of the dynamic information corresponding to a specific region of the static map based upon the generation time and the expiration time of the dynamic information corresponding to the specific region of the static map;
determine whether to update a dynamic map, among the dynamic maps, corresponding to the specific region of the static map in accordance with the degree of freshness determined based upon the generation time and the expiration time of the dynamic information corresponding to the specific region, including:
determining that the dynamic map corresponding to the specific region is to be updated when a current time exceeds the effective time, and
determining that the dynamic map corresponding to the specific region is not to be updated when the current time does not exceed the effective time;
in response to determining that the dynamic map corresponding to the specific region is to be updated in accordance with the degree of freshness determined based upon the generation time and the expiration time of the dynamic information corresponding to the specific region, update the dynamic map corresponding to the specific region with a new dynamic map generated from data newly received;
in response to determining that the dynamic map corresponding to the specific region is not to be updated in accordance with the degree of freshness determined based upon the generation time and the expiration time of the dynamic information corresponding to the specific region, not update the dynamic map corresponding to the specific region, and
control automated driving of a vehicle in which the vehicle-mounted apparatus is mounted using the dynamic maps.

2. The vehicle-mounted apparatus according to claim 1, wherein the processing circuitry is configured to:
in response to determining that the dynamic map corresponding to the specific region is to be updated in accordance with the degree of freshness determined based upon the generation time and the expiration time of the dynamic information corresponding to the specific region, transmit, to the outside, a transmission request for transmitting data that satisfies a predetermined condition on the degree of freshness, and
in response to receiving data transmitted in response to the transmission request, generate the new dynamic map from the data transmitted in response to the transmission request.

3. The vehicle-mounted apparatus according to claim 1, wherein
the data includes sensor data,
the dynamic information includes information regarding displacement of the dynamic object detected by analyzing the sensor data.

4. The vehicle-mounted apparatus according to claim 3, wherein the processing circuitry is configured to:
estimate, for the dynamic object, displacement of the dynamic object during a period from a present time to a time in the future when a predetermined time elapses,
in response to determining that the dynamic map corresponding to the specific region is to be updated in accordance with the degree of freshness determined based upon the generation time and the expiration time of the dynamic information corresponding to the specific region, estimate, for the dynamic object included in the specific region, displacement of the dynamic object during the period from the present time to the time in the future when the predetermined time elapses, and
complement the dynamic map corresponding to the specific region by using the estimated displacement.

5. The vehicle-mounted apparatus according to claim 4, wherein the processing circuitry is configured to:

determine a degree of certainty of the complemented dynamic map, and in response to determining that the degree of certainty of the complemented dynamic map is low, not use the complemented dynamic map in the automated driving of the vehicle.

6. The vehicle-mounted apparatus according to claim 4, wherein the processing circuitry is configured to:

transmit, to the outside, a transmission request for transmitting data that satisfies a predetermined condition on the degree of freshness, monitor for a transmittable response to the transmission request; and in response to not receiving the transmittable response within a predetermined period, perform the complementing of the dynamic map corresponding to the specific region by using the estimated displacement.

7. The vehicle-mounted apparatus according to claim 4, wherein the processing circuitry is configured to incorporate the time in the future into the complemented dynamic map as a new expiration time when the predetermined time elapses.

8. The vehicle-mounted apparatus according to claim 1, wherein the processing circuitry is configured to:

determine a degree of certainty of a dynamic map corresponding to a planned travel section of the vehicle in which the vehicle-mounted apparatus is mounted, and in response to determining that the degree of certainty of the dynamic map corresponding to the planned travel section is low, not use the dynamic map corresponding to the planned travel section in the automated driving of the vehicle.

9. The vehicle-mounted apparatus according to claim 1, wherein the static map is a road map, and the specific region is one of a plurality of grid regions on the road map determined by dividing a region that includes at least a road in a grid-like form.

10. The vehicle-mounted apparatus according to claim 1, wherein the processing circuitry is configured to, in response to generating the new dynamic map, transmit the new dynamic map to the outside.

11. The vehicle-mounted apparatus according to claim 1, wherein the degree of freshness further includes a disappearance time at which the dynamic object is estimated to have disappeared from the specific region.

12. The vehicle-mounted apparatus according to claim 11, wherein the processing circuitry is configured to determine that the dynamic map corresponding to the specific region is to be updated when the current time exceeds the disappearance time by a predetermined time.

13. The vehicle-mounted apparatus according to claim 1, wherein the processing circuitry is configured to:

determine if the degree of freshness corresponding to a planned travel section is below the threshold; and in response to determining that the degree of freshness of the dynamic map corresponding to the planned travel section is below the threshold, generate a travel plan using sensor data output from a sensor mounted on the vehicle without using the dynamic map.

14. An information distribution apparatus comprising:

processing circuitry configured to:

receive data from an outside;

generate, from the data, dynamic maps in each of which dynamic information regarding a dynamic object is associated with a static map, the generating the dynamic maps including generating, from the data, a generation time of the dynamic information and generating, from the data, an expiration time of the dynamic information, the dynamic information including the generation time of the dynamic information and the expiration time of the dynamic information;

store the dynamic maps and the static map;

calculate an effective time by adding the generation time and the expiration time;

determine a degree of freshness of the dynamic information corresponding to a specific region of the static map based upon the generation time and the expiration time of the dynamic information corresponding to the specific region of the static map;

determine whether to update a dynamic map, among the dynamic maps, corresponding to the specific region of the static map in accordance with the degree of freshness determined based upon the generation time and the expiration time of the dynamic information corresponding to the specific region, including:

determining that the dynamic map corresponding to the specific region is to be updated when a current time exceeds the effective time, and determining that the dynamic map corresponding to the specific region is not to be updated when the current time does not exceed the effective time;

in response to determining that the dynamic map corresponding to the specific region is to be updated in accordance with the degree of freshness determined based upon the generation time and the expiration time of the dynamic information corresponding to the specific region, update the dynamic map corresponding to the specific region with a new dynamic map generated from data newly received;

in response to determining that the dynamic map corresponding to the specific region is not to be updated in accordance with the degree of freshness determined based upon the generation time and the expiration time of the dynamic information corresponding to the specific region, not update the dynamic map corresponding to the specific region;

in response to generating the new dynamic map, transmit the new dynamic map to the outside; and control automated driving of a vehicle using the dynamic maps.

15. A vehicle-mounted apparatus comprising:

vehicle-mounted processing circuitry configured to:

receive the dynamic maps from the information distribution apparatus according to claim 14; and control the automated driving of the vehicle in which the vehicle-mounted processing circuitry is mounted by using the dynamic maps.

16. A vehicle-mounted apparatus comprising:

vehicle-mounted processing circuitry configured to:

receive the dynamic maps from the information distribution apparatus according to claim 14; and generate and present driving assistance information from the dynamic maps.

17. A driving assistance system comprising:

a server; and a vehicle-mounted apparatus, wherein the server includes server processing circuitry configured to:

receive sensor data from an outside, detect dynamic objects by analyzing the sensor data, generate pieces of dynamic information regarding displacement of the dynamic objects, and transmit data that includes at least one of the sensor data or the pieces of dynamic information to the vehicle-mounted apparatus, the vehicle-mounted apparatus includes vehicle-mounted apparatus processing circuitry configured to:

receive the data transmitted from the server;

generate, from the data, dynamic maps in each of which a corresponding one of the pieces of dynamic information is associated with a static map, the generating the dynamic maps including generating, from the data, a generation time of the dynamic information and generating, from the data, an expiration time of the dynamic information, the dynamic information including the generation time of the dynamic information and the expiration time of the dynamic information;

store the dynamic maps and the static map;

calculate an effective time by adding the generation time and the expiration time;

determine a degree of freshness of the dynamic information corresponding to a specific region of the static map based upon the generation time and the expiration time of the piece of dynamic information corresponding to the specific region of the static map;

determine whether to update a dynamic map, among the dynamic maps, corresponding to the specific region of the static map in accordance with the degree of freshness determined based upon the generation time and the expiration time of the piece of dynamic information corresponding to the specific region, including:

determining that the dynamic map corresponding to the specific region is to be updated when a current time exceeds the effective time, and determining that the dynamic map corresponding to the specific region is not to be updated when the current time does not exceed the effective time, and in response to determining that the dynamic map corresponding to the specific region is to be updated in accordance with the degree of freshness determined based upon the generation time and the expiration time of the dynamic information corresponding to the specific region, update the dynamic map corresponding to the specific region with a new dynamic map generated from data newly received;

in response to determining that the dynamic map corresponding to the specific region is not to be updated in accordance with the degree of freshness determined based upon the generation time and the expiration time of the piece of dynamic information corresponding to the specific region, not update the dynamic map corresponding to the specific region; and control automated driving of a vehicle in which the vehicle-mounted apparatus is mounted using the dynamic maps.

18. A control method for an apparatus having a communication function, the control method comprising:

receiving data from an outside, generating, from the data, dynamic maps in each of which dynamic information regarding a dynamic object is associated with a static map, the generating the dynamic maps including generating, from the data, a generation time of the dynamic information and generating, from the data, an expiration time of the dynamic information, the dynamic information including the generation time of the dynamic information and the expiration time of the dynamic information;

storing the dynamic maps and the static map;

calculating an effective time by adding the generation time and the expiration time;

determining a degree of freshness of the dynamic information corresponding to a specific region of the static map based upon the generation time and the expiration time of the dynamic information corresponding to the specific region of the static map;

determining whether to update a dynamic map, among the dynamic maps, corresponding to the specific region of the static map, in accordance with the degree of freshness determined based upon the generation time and the expiration time of the dynamic information corresponding to the specific region, including:

determining that the dynamic map corresponding to the specific region is to be updated when a current time exceeds the effective time, and determining that the dynamic map corresponding to the specific region is not to be updated when the current time does not exceed the effective time;

updating, in response to determining that the dynamic map corresponding to the specific region is to be updated in accordance with the degree of freshness determined based upon the generation time and the expiration time of the dynamic information corresponding to the specific region, the dynamic map corresponding to the specific region with a new dynamic map generated from data newly received;

not updating, in response to determining that the dynamic map corresponding to the specific region is not to be updated in accordance with the degree of freshness determined based upon the generation time and the expiration time of the dynamic information corresponding to the specific region, the dynamic map corresponding to the specific region; and using the dynamic maps in automated driving of a vehicle.

19. A non-transitory computer-readable recording medium storing a computer program for causing a computer to execute:

receiving data from an outside, generating, from the data, dynamic maps in each of which dynamic information regarding a dynamic object is associated with a static map, the generating the dynamic maps including generating, from the data, a generation time of the dynamic information and generating, from the data, an expiration time of the dynamic information, the dynamic information including the generation time of the dynamic information and the expiration time of the dynamic information;

storing the dynamic maps and the static map;

calculating an effective time by adding the generation time and the expiration time;

determining a degree of freshness of the dynamic information corresponding to a specific region of the static map based upon the generation time and the expiration time of the dynamic information corresponding to the specific region of the static map;

determining whether to update a dynamic map, among the dynamic maps, corresponding to the specific region of the static map, in accordance with the degree of freshness determined based upon the generation time and the expiration time of the dynamic information corresponding to the specific region, including:

determining that the dynamic map corresponding to the specific region is to be updated when a current time exceeds the effective time, and determining that the dynamic map corresponding to the specific region is not to be updated when the current time does not exceed the effective time;

updating, in response to determining that the dynamic map corresponding to the specific region is to be updated in accordance with the degree of freshness determined based upon the generation time and the expiration time of the dynamic information corresponding to the specific region, the dynamic map corresponding to the specific region with a new dynamic map generated from data newly received;

not updating, in response to determining that the dynamic map corresponding to the specific region is not to be updated in accordance with the degree of freshness determined based upon the generation time and the expiration time of the dynamic information corresponding to the specific region, the dynamic map corresponding to the specific region; and using the dynamic maps in automated driving of a vehicle.

* * * * *